(12) United States Patent
Kang et al.

(10) Patent No.: US 11,964,457 B2
(45) Date of Patent: Apr. 23, 2024

(54) RELEASE FILM

(71) Applicant: Samsung Display Co., Ltd., Yongin-si (KR)

(72) Inventors: Hoseung Kang, Asan-si (KR); Minseop Kim, Cheonan-si (KR); Hosung Nam, Seoul (KR); Munsik Ham, Cheonan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 181 days.

(21) Appl. No.: 17/227,169

(22) Filed: Apr. 9, 2021

(65) Prior Publication Data

US 2022/0048272 A1 Feb. 17, 2022

(30) Foreign Application Priority Data

Aug. 14, 2020 (KR) ........................ 10-2020-0102518

(51) Int. Cl.
*B32B 3/26* (2006.01)
*B32B 7/12* (2006.01)
*B32B 27/28* (2006.01)
*B32B 27/36* (2006.01)
*H10K 71/00* (2023.01)

(52) U.S. Cl.
CPC ............... *B32B 3/266* (2013.01); *B32B 7/12* (2013.01); *B32B 27/281* (2013.01); *B32B 27/36* (2013.01); *B32B 2307/40* (2013.01); *B32B 2457/206* (2013.01); *H10K 71/00* (2023.02)

(58) Field of Classification Search
CPC ....... B32B 3/266; B32B 7/12; B32B 2307/40; B32B 2457/206
See application file for complete search history.

(56) References Cited

U.S. PATENT DOCUMENTS

| | | | |
|---|---|---|---|
| 2017/0253014 A1 | 9/2017 | Kleeman et al. | |
| 2019/0047815 A1* | 2/2019 | Kim ........................ | C09J 7/00 |

FOREIGN PATENT DOCUMENTS

| | | | |
|---|---|---|---|
| EP | 3352045 A1 | 7/2018 | |
| GB | 2578414 A | 5/2020 | |
| JP | 4945829 B2 | 6/2012 | |
| KR | 101069642 B1 * | 10/2011 | |
| KR | 10-2015-0142521 A | 12/2015 | |
| KR | 20-0488338 Y1 | 1/2019 | |
| KR | 10-2049780 B1 | 11/2019 | |
| WO | 2013/191507 A1 | 12/2013 | |

OTHER PUBLICATIONS

Ip.com Translation of KR 101069642 B1 (Year: 2023).*
EPO Extended European Search Report dated Jan. 5, 2022, issued in corresponding European Patent Application No. 21188370.7 (7 pages).

* cited by examiner

*Primary Examiner* — Michael Zhang
(74) *Attorney, Agent, or Firm* — Lewis Roca Rothgerber Christie LLP

(57) ABSTRACT

Disclosed is a release film including a first release film on a supporter in which a first hole is defined, and a second release film below the supporter, wherein, when viewed in a plan view, a first cut region is defined by a first part of the second release film, the first part overlapping the first hole.

21 Claims, 23 Drawing Sheets

RELEASE FILM

CROSS-REFERENCE TO RELATED APPLICATION

This application claims priority to, and the benefit of, Korean Patent Application No. 10-2020-0102518 filed on Aug. 14, 2020 in the Korean Intellectual Property Office, the disclosure of which is hereby incorporated by reference in its entirety.

BACKGROUND

1. Field

The present disclosure relates to a release film.

2. Description of the Related Art

In general, display devices include a display module to display an image, and a supporter to support the display module. The display module includes a display panel, a window to rest on the display panel and to protect the display panel against external scratches and impact, and a cover layer to lie below the display panel and to protect the display panel from external impact. The supporter has rigidity that is greater than that of the display module and supports the display module. The supporter includes a metal-containing support plate.

Display devices including flexible display modules have recently been developed with the technical advancement thereof. Among the flexible display modules, a display module that is foldable about its folding axis has, on its underside, a supporter having a structure that is folded together with the display module.

SUMMARY

Some embodiments of the present disclosure provide a release film that protects a supporter, and that allows suitable processes of fabricating display devices.

According to some embodiments of the present disclosure, a release film may include a first release film on a supporter in which a first hole is defined, and a second release film below the supporter, wherein, when viewed in a plan view, a first cut region is defined by a first part of the second release film, the first part overlapping the first hole.

The first cut region may include a first sub-cut region that extends in a first direction, and a second sub-cut region that extends in a second direction crossing the first direction.

The second sub-cut region may cross the first sub-cut region.

A second hole may be defined by the supporter, wherein a second cut region is defined by a second part of the second release film, the second part overlapping the second hole.

The second cut region may include a third sub-cut region that extends in a first direction, and a fourth sub-cut region that extends in a second direction crossing the first direction.

The fourth sub-cut region may cross the third sub-cut region.

The second release film may include a first sub-release film below the supporter, and a second sub-release film below the first sub-release film.

The first cut region may be defined by the first and second sub-release films.

The release film may further include a light-shield layer on one surface of the second sub-release film.

The second cut region may be defined by the light-shield layer and the second sub-release film.

The light-shield layer may be on a top surface of the second sub-release film.

The light-shield layer may be in a sub-hole defined by a portion of the first sub-release film overlapping the second hole.

The light-shield layer may be on a bottom surface of the second sub-release film.

The light-shield layer may be directly on a bottom surface of the second sub-release film.

The first cut region may have a width and is opened from the first part of the first sub-release film to an edge of the first sub-release film, the first part overlapping the first hole, and the edge of the first sub-release film being adjacent to the first part.

The second cut region may have a width and is opened from the second part of the first sub-release film to an edge of the first sub-release film, the second part overlapping the second hole, and the edge of the first sub-release film being adjacent to the second part.

The release film may further include a third release film below the supporter, adjacent to the second release film, and not overlapping the second release film in a plan view.

The supporter may include a first plate, a cover layer below the first plate, a second plate below the cover layer, a cushion layer below the second plate, an insulation layer below the cushion layer, a step compensation layer below the first plate, and a border adhesive layer below the step compensation layer, wherein the second release film is below the insulation layer and the border adhesive layer.

The first hole and the second hole may be defined by the border adhesive layer, the step compensation layer, and the first plate.

The third release film may be below the first plate, and is adjacent to a first edge of each of the cover layer, the second plate, the cushion layer, and the insulation layer, wherein the step compensation layer and the border adhesive layer are adjacent to a second edge of each of the cover layer, the second plate, the cushion layer, and the insulation layer.

According to some embodiments of the present disclosure, a release film may include a first release film on a supporter in which a first hole and a second hole are defined, a first sub-release film below the supporter, a second sub-release film below the first sub-release film, and a light-shield layer in a sub-hole defined by a portion of the first sub-release film that overlaps the second hole when viewed in a plan, wherein, when viewed in the plan, a first cut region is defined by portions of the first and second sub-release films that overlap the first hole, and wherein, when viewed in the plan, a second cut region is defined by the light-shield layer and a portion of the second sub-release film that overlaps the second hole.

DETAILED DESCRIPTION

Figure 1:
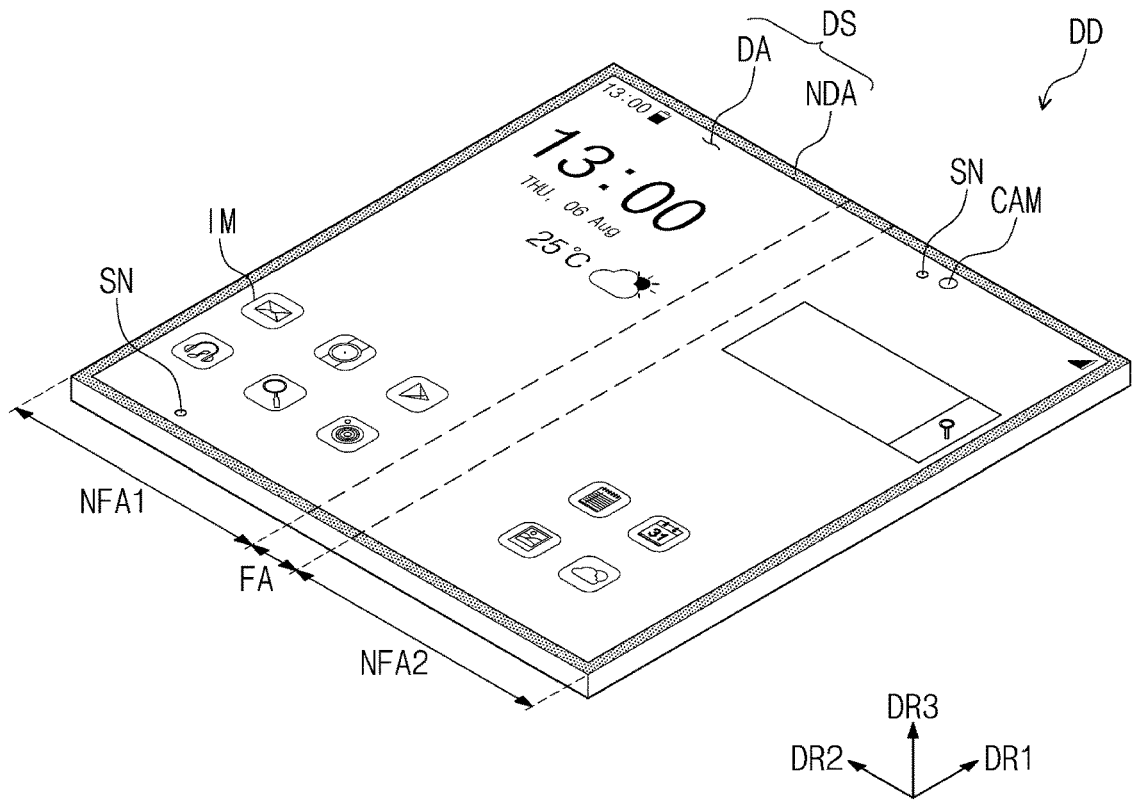
FIG. 1 illustrates a perspective view showing a display device fabricated using a supporter that is protected with a release film according to some embodiments of the present disclosure.

Aspects of some embodiments of the present disclosure and methods of accomplishing the same may be understood more readily by reference to the detailed description of embodiments and the accompanying drawings. Hereinafter, embodiments will be described in more detail with reference to the accompanying drawings. The described embodiments, however, may be embodied in various different forms, and should not be construed as being limited to only the illustrated embodiments herein. Rather, these embodiments are provided as examples so that this disclosure will be thorough and complete, and will fully convey the aspects of the present disclosure to those skilled in the art. Accordingly, processes, elements, and techniques that are not necessary to those having ordinary skill in the art for a complete understanding of the aspects of the present disclosure might not be described.

Unless otherwise noted, like reference numerals, characters, or combinations thereof denote like elements throughout the attached drawings and the written description, and thus, descriptions thereof will not be repeated. Further, parts not related to the description of the embodiments might not be shown to make the description clear. In the drawings, the relative sizes of elements, layers, and regions may be exaggerated for clarity. Additionally, the use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified.

Various embodiments are described herein with reference to sectional illustrations that are schematic illustrations of embodiments and/or intermediate structures. As such, variations from the shapes of the illustrations as a result, for example, of manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the particular illustrated shapes of regions, but are to include deviations in shapes that result from, for instance, manufacturing.

For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting. Additionally, as those skilled in the art would realize, the described embodiments may be modified in various different ways, all without departing from the spirit or scope of the present disclosure.

In the detailed description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form in order to avoid unnecessarily obscuring various embodiments.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. Similarly, when a first part is described as being arranged "on" a second part, this indicates that the first part is arranged at an upper side or a lower side of the second part without the limitation to the upper side thereof on the basis of the gravity direction.

Further, in this specification, the phrase "on a plane," or "plan view," means viewing a target portion from the top, and the phrase "on a cross-section" means viewing a cross-section formed by vertically cutting a target portion from the side.

It will be understood that when an element, layer, region, or component is referred to as being "formed on," "on," "connected to," or "coupled to" another element, layer, region, or component, it can be directly formed on, on, connected to, or coupled to the other element, layer, region, or component, or indirectly formed on, on, connected to, or coupled to the other element, layer, region, or component such that one or more intervening elements, layers, regions, or components may be present. For example, when a layer, region, or component is referred to as being "electrically connected" or "electrically coupled" to another layer, region, or component, it can be directly electrically connected or coupled to the other layer, region, and/or component or intervening layers, regions, or components may be present. However, "directly connected/directly coupled" refers to one component directly connecting or coupling another component without an intermediate component. Meanwhile, other expressions describing relationships between components such as "between," "immediately between" or "adjacent to" and "directly adjacent to" may be construed similarly. In addition, it will also be understood that when an element or layer is referred to as being "between" two elements or layers, it can be the only element or layer between the two elements or layers, or one or more intervening elements or layers may also be present.

For the purposes of this disclosure, expressions such as "at least one of," when preceding a list of elements, modify the entire list of elements and do not modify the individual elements of the list. For example, "at least one of X, Y, and Z," "at least one of X, Y, or Z," and "at least one selected from the group consisting of X, Y, and Z" may be construed as X only, Y only, Z only, any combination of two or more of X, Y, and Z, such as, for instance, XYZ, XYY, YZ, and ZZ, or any variation thereof. Similarly, the expression such as "at least one of A and B" may include A, B, or A and B. As used herein, the term "and/or" includes any and all combinations of one or more of the associated listed items. For example, the expression such as "A and/or B" may include A, B, or A and B.

In the examples, the x-axis, the y-axis, and/or the z-axis are not limited to three axes of a rectangular coordinate system, and may be interpreted in a broader sense. For example, the x-axis, the y-axis, and the z-axis may be perpendicular to one another, or may represent different directions that are not perpendicular to one another. The same applies for first, second, and/or third directions.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure."

When one or more embodiments may be implemented differently, a specific process order may be performed differently from the described order. For example, two consecutively described processes may be performed substantially at the same time or performed in an order opposite to the described order.

Also, any numerical range disclosed and/or recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such subranges would comply with the requirements of 35 U.S.C. § 112(a) and 35 U.S.C. § 132(a).

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 2:
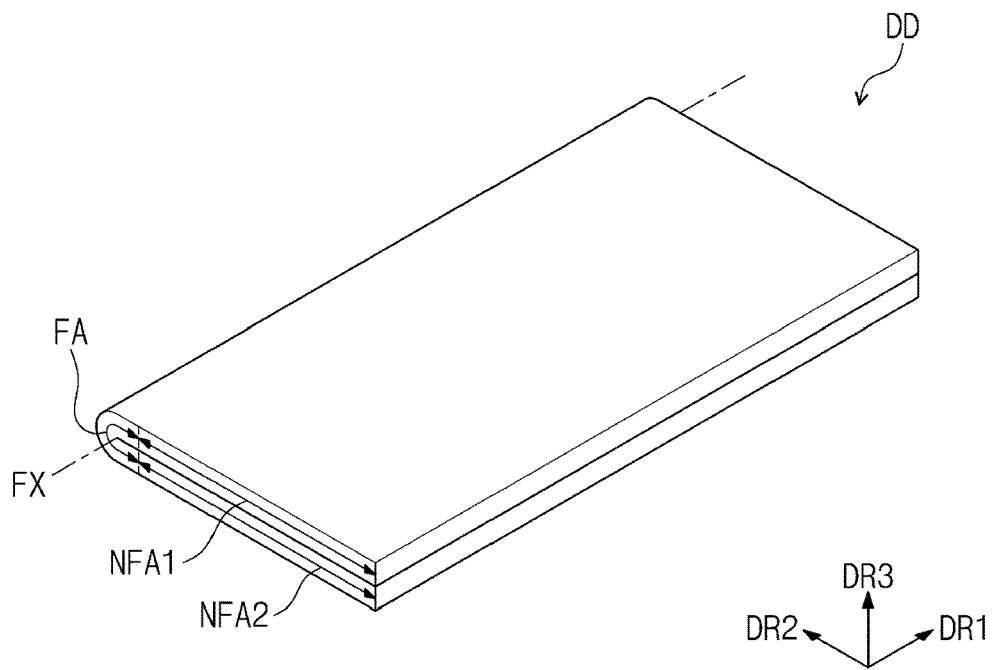
FIG. 2 illustrates a perspective view showing a folded state of the display device depicted in FIG. 1.

FIG. 1 illustrates a perspective view showing a display device fabricated using a supporter that is protected with a release film according to some embodiments of the present disclosure, and FIG. 2 illustrates a perspective view showing a folded state of the display device depicted in FIG. 1.

Referring to FIG. 1, a display device DD according to some embodiments of the present disclosure may have a rectangular shape with long sides that extend in a first direction DR1, and short sides that extend in a second direction DR2 intersecting/crossing the first direction DR1. The present disclosure, however, is not limited thereto, and the display device DD may have various shapes such as a circular shape or a polygonal shape. The display device DD may be a flexible display device.

A third direction DR3 is defined herein as a direction that substantially vertically intersects a plane formed by the first and second directions DR1 and DR2. In this description, the phrase "when viewed in plan" may be defined to refer to "when viewed in the third direction DR3."

The display device DD may include a folding area FA and a plurality of non-folding areas NFA1 and NFA2. The non-folding areas NFA1 and NFA2 may include a first non-folding area NFA1 and a second non-folding area NFA2. The folding area FA may be between the first non-folding area NFA1 and the second non-folding area NFA2. The folding area FA, the first non-folding area NFA1, and the second non-folding area NFA2 may be arranged in the second direction DR2.

Although one folding area FA and two non-folding areas NFA1 and NFA2 are illustrated by way of example, no limitation is imposed on the number of the folding area FA and on the number of the non-folding areas NFA1 and NFA2. For example, the display device DD may include more than two non-folding areas and a plurality of folding areas between the non-folding areas.

The display device DD may have a top surface that is defined as a display surface DS, and the display surface DS may have a plane defined by the first and second directions DR1 and DR2. The display surface DS may provide users with images IM generated from the display device DD.

The display surface DS may include a display area DA, and a non-display area NDA around the display area DA. The display area DA may display the images IM, and the non-display area NDA might not display the images IM. The non-display area NDA may surround the display area DA, and may provide the display device DD with an edge that is printed with a certain color.

The display device DD may include a plurality of sensors SN and at least one camera CAM. The sensors SN and the camera CAM may be adjacent to the edge of the display device DD. The sensors SN and the camera CAM may be on the display area DA adjacent to the non-display area NDA. The sensors SN and the camera CAM may be on the first and/or second non-folding areas NFA1 and/or NFA2.

The sensors SN may be, for example, proximity sensors, but the type thereof is not limited. The camera CAM may capture external images.

Referring to FIG. 2, the display device DD may be a foldable display device that can be folded or unfolded. For example, the folding area FA may bend about a folding axis FX that is parallel to the second direction DR2, and in turn the display device DD may become folded. The folding axis FX may be defined as a major axis parallel to a long side of the display device DD.

When the display device DD is folded, the first non-folding area NFA1 and the second non-folding area NFA2 may face each other, and the display device DD may be in-folded such that the display surface DS is not externally exposed.

Figure 3:
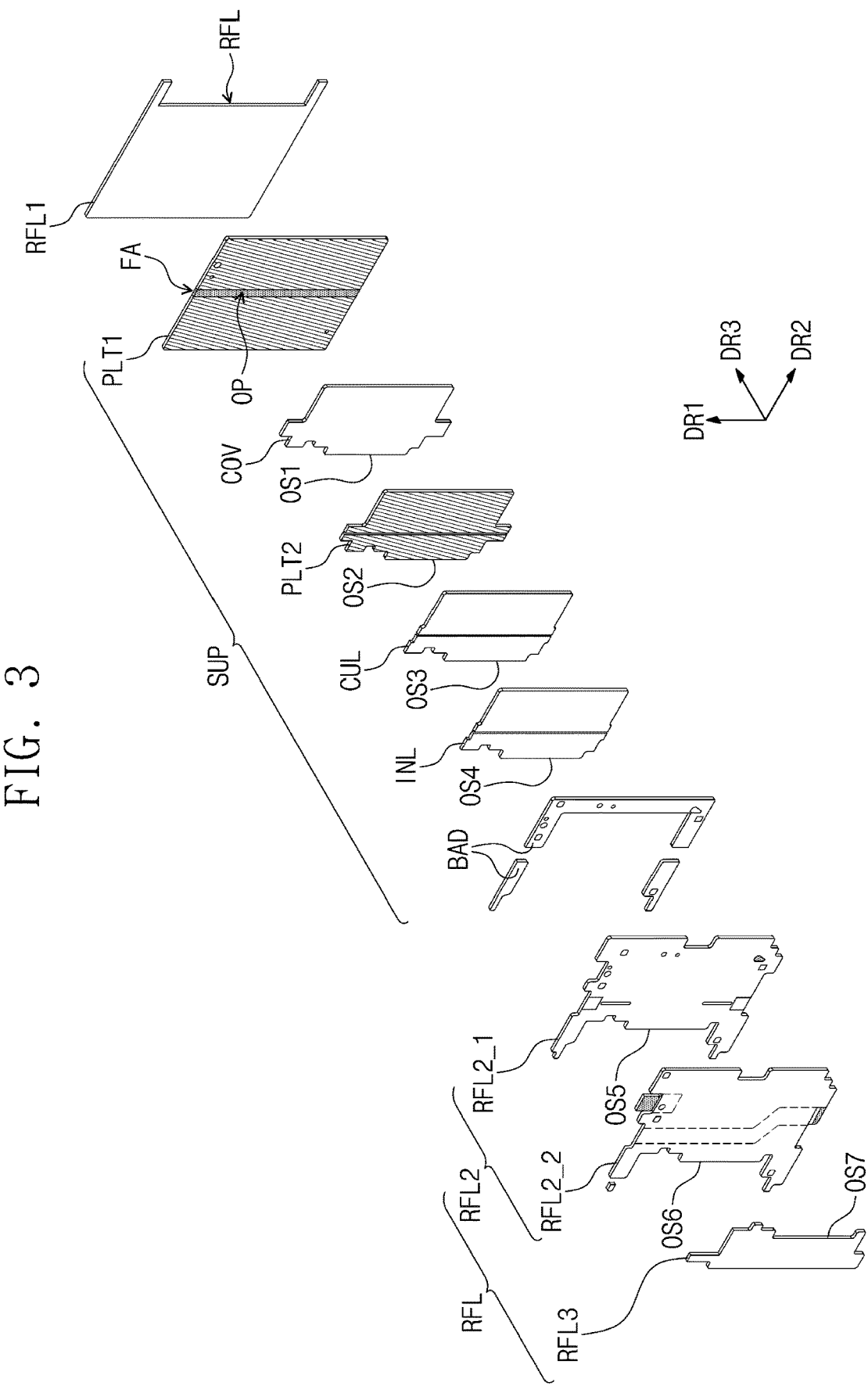
FIG. 3 illustrates an exploded perspective view showing a release film and a supporter that is protected with the release film according to some embodiments of the present disclosure.

FIG. 3 illustrates an exploded perspective view showing a release film and a supporter that is protected with the release film according to some embodiments of the present disclosure.

Referring to FIG. 3, a release film RFL may be on upper and lower portions of a supporter SUP, thereby protecting the supporter SUP. The supporter SUP may be protected with the release film RFL, and may be transferred to process chambers for fabricating the display device DD.

The release film RFL may include a first release film RFL1, a second release film RFL2, and a third release film RFL3. The first release film RFL1 may be on, or above, the supporter SUP. The second and third release films RFL2 and RFL3 may be below the supporter SUP. The third release film RFL3 may be adjacent to the second release film RFL2.

The first release film RFL1 may protect the upper portion of the supporter SUP, and the second and third release films RFL2 and RFL3 may protect the lower portion of the supporter SUP. In some embodiments, each of the first, second, and third release films RFL1, RFL2, and RFL3 may include a base film, and an adhesive on one side of the base film.

The second release film RFL2 may include a first sub-release film RFL2_1 below the supporter SUP, and a second sub-release film RFL2_2 below the first sub-release film RFL2_1.

Each of the first, second, and third release films RFL1, RFL2, and RFL3 may have a planar structure, which will be discussed below in detail with reference to FIGS. 6 and 7.

The supporter SUP may include a first plate PLT1, a cover layer COV, a second plate PLT2, a cushion layer CUL, an insulation layer INL, and a border adhesive layer BAD.

The first plate PLT1 may be below the first release film RFL1. The first plate PLT1 may have openings OP that overlap the folding area FA. The openings OP may have structures that will be illustrated below in FIGS. 4 and 5.

The first plate PLT1 may include a material whose elastic modulus is equal to or greater than about 60 GPa. The first plate PLT1 may include a metallic material, such as a stainless steel. For example, the first plate PLT1 may include SUS304, but the present disclosure is not limited thereto and the first plate PLT1 may include various metallic materials.

The cover layer COV may be below the first plate PLT1. The cover layer COV may have an elastic modulus less than that of the first plate PLT1. For example, the cover layer COV may include thermoplastic polyurethane or rubber, but the present disclosure is not limited thereto. The cover layer COV may be fabricated in the form of a sheet and attached to the first plate PLT1.

The second plate PLT2 may be below the cover layer COV. The second plate PLT2 may include metal. The second plate PLT2 may serve as a heat radiation layer. The second plate PLT2 may include copper, copper alloys, and/or graphite. This, however, is merely an example, and the second plate PLT2 may include various metals (e.g., an INVAR® alloy (INVAR is a registered trademark of Aperam Alloys IMPHY Joint Stock Company), or stainless steel).

The cushion layer CUL may be below the second plate PLT2. The cushion layer CUL may absorb external impact. The cushion layer CUL may include a resilient foam sheet. The cushion layer CUL may include foam, sponge, polyurethane, or thermoplastic polyurethane.

The insulation layer INL may be below the cushion layer CUL. The insulation layer INL may include a dielectric tape.

The insulation layer INL may reduce or prevent the likelihood of introduction of static electricity.

The border adhesive layer BAD may be along an edge of the first plate PLT1. The border adhesive layer BAD may extend on opposite sides of the first plate PLT1 that face each other with respect to the first direction DR1.

The border adhesive layer BAD may be omitted from one of opposite sides of the first plate PLT1 that face each other in the second direction DR2, while extending (e.g., downwardly) on the other of the opposite sides of the first plate PLT1 that face each other in the second direction DR2.

When viewed in plan/in a plan view, the second plate PLT2, the cushion layer CUL, the insulation layer INL, and the border adhesive layer BAD may be respectively separated at a region that overlaps the folding area FA.

The second plate PLT2, the cover layer COV, the cushion layer CUL, and the insulation layer INL may have their respective sides OS1, OS2, OS3, and OS4 that are adjacent to one side of the first plate PLT1, and the sides OS1, OS2, OS3, and OS4 may be patterned into a suitable shape.

The first and second sub-release films RFL2_1 and RFL2_2 may have their respective sides OS5 and OS6, each of which having a shape that corresponds to that of the sides OS1, OS2, OS3, and OS4 of the second plate PLT2, the cover layer COV, the cushion layer CUL, and the insulation layer INL.

The third release film RFL3 may have a side OS7 that faces the sides OS5 and OS6 of the first and second sub-release films RFL2_1 and RFL2_2, and the side OS7 of the third release film RFL3 may have a shape that is opposite to that of the sides OS5 and OS6 of the first and second sub-release films RFL2_1 and RFL2_2. For example, when the first and second sub-release films RFL2_1 and RFL2_2 are defined to have their engraved sides OS5 and OS6, the third release film RFL3 may be defined to have an embossed side OS7 that corresponds to the engraved sides OS5 and OS6.

FIG. 3 shows by way of example that components have similar thicknesses to each other, but the components may have different thicknesses from each other in other embodiments. A structure related to such thickness will be illustrated below in FIG. 8.

Figure 4:
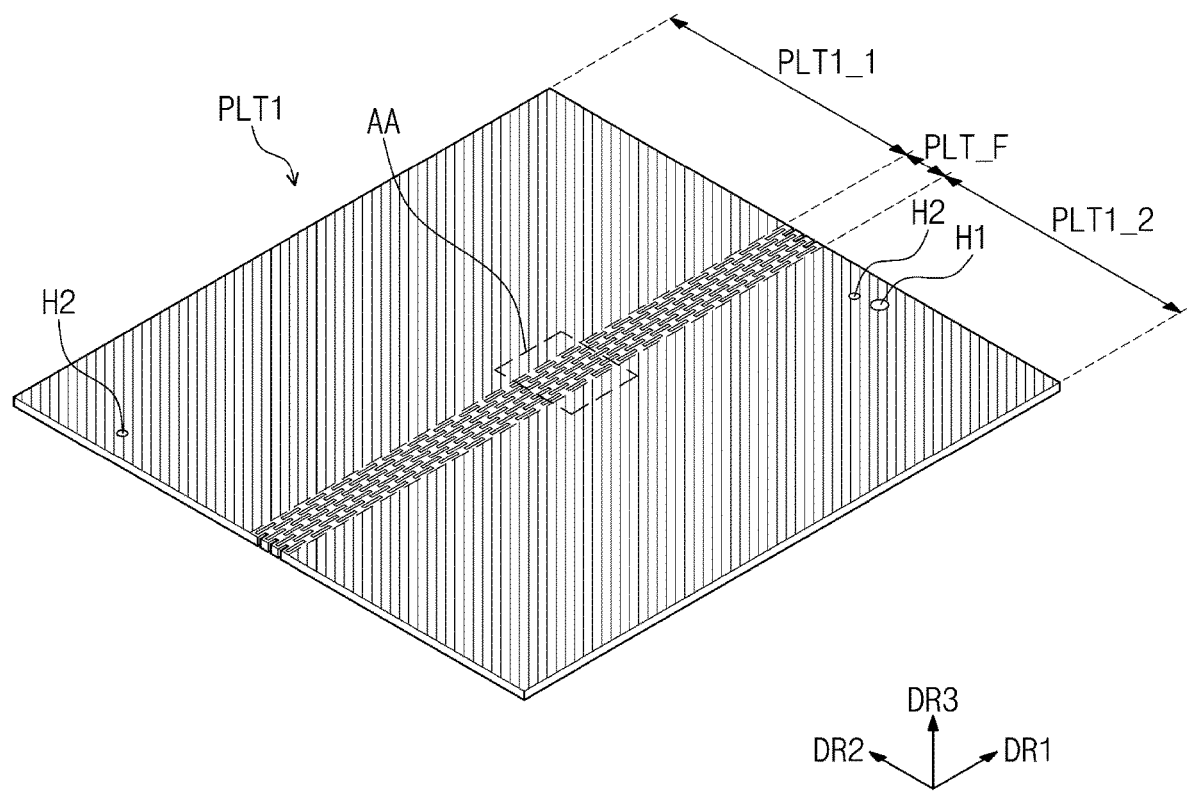
FIG. 4 illustrates an enlarged perspective view showing a first plate depicted in FIG. 3.
Figure 5:
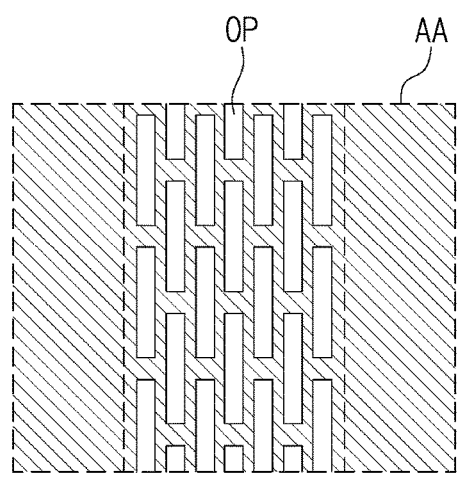
FIG. 5 illustrates an enlarged plan view showing section AA depicted in FIG. 4.

FIG. 4 illustrates an enlarged perspective view showing the first plate depicted in FIG. 3, and FIG. 5 illustrates an enlarged plan view showing section AA depicted in FIG. 4.

Referring to FIGS. 4 and 5, the first plate PLT1 may include a first_first plate PLT1_1, a first_second plate PLT1_2, and a folding plate PLT_F. The folding plate PLT_F may be between the first_first plate PLT1_1 and the first_second plate PLT1_2.

The folding plate PLT_F may have a plurality of openings OP defined therein. The openings OP may be suitably arranged. The openings OP may be arrayed in a grid shape.

As the folding plate PLT_F has the openings OP defined therein, the folding plate PLT_F may have a reduced area to decrease rigidity thereof. Therefore, flexibility of the folding plate PLT_F may be increased compared to a case where the folding plate PLT_F has no openings OP. As a result, the folding plate PLT_F may be suitably foldable.

The first plate PLT1 may have a first hole H1 and a plurality of second holes H2 defined therein. The first hole H1 and the second holes H2 may be adjacent to the edge of the first plate PLT1. For example, the first hole H1 and one of the second holes H2 may be defined by the first_second plate PLT1_2, and another one of the second holes H2 may be defined by the first_first plate PLT1_1, but no limitation is imposed on the position of any of the first and second holes H1 and H2.

The camera CAM may be in the first hole H1. The sensors H2 may be in the second holes H2.

Figure 6:
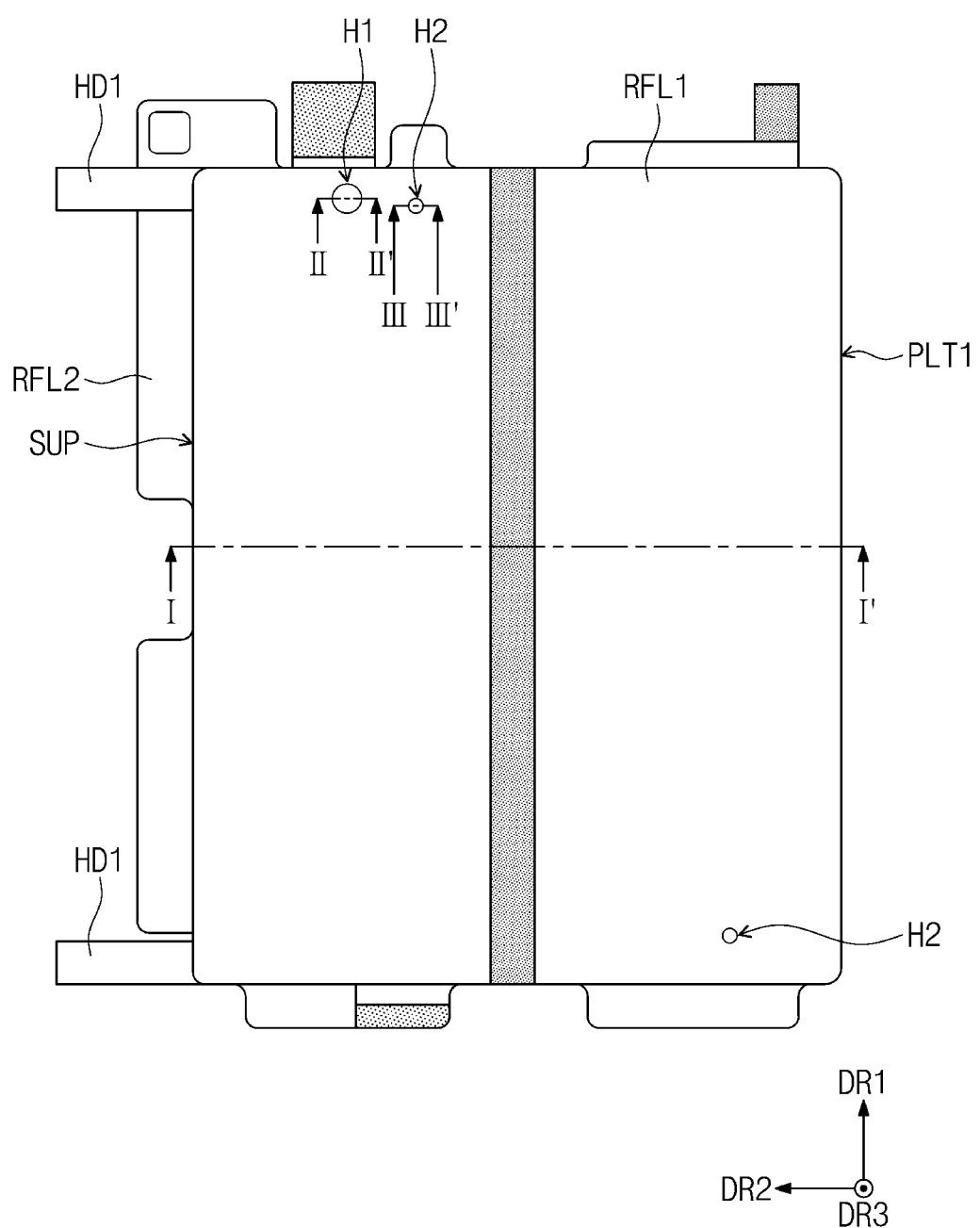
FIG. 6 illustrates a plan view showing the supporter depicted in FIG. 3 and a first release film on the supporter.

FIG. 6 illustrates a plan view showing the supporter depicted in FIG. 3 and the first release film on the supporter.

FIG. 6 shows by way of example that openings defined by the first plate PLT1 are colored gray. In addition, the first plate PLT1 is illustrated to have a shape aligned with that of the first release film RFL1 below which the first plate PLT1 is located. FIG. 3 will also be referenced below as needed.

Referring to FIGS. 3 and 6, the first release film RFL1 may cover the upper portion of the supporter SUP. The first release film RFL1 may cover the first plate PLT1. When viewed in a plan view, the first release film RFL1 may include a plurality of first handlers HD1 that outwardly protrude beyond the supporter SUP.

The first handlers HD1 may be used, if suitable, to remove the first release film RFL1. For example, a delamination tool may grip the first handlers HD1 to separate the first release film RFL1.

Figure 7:
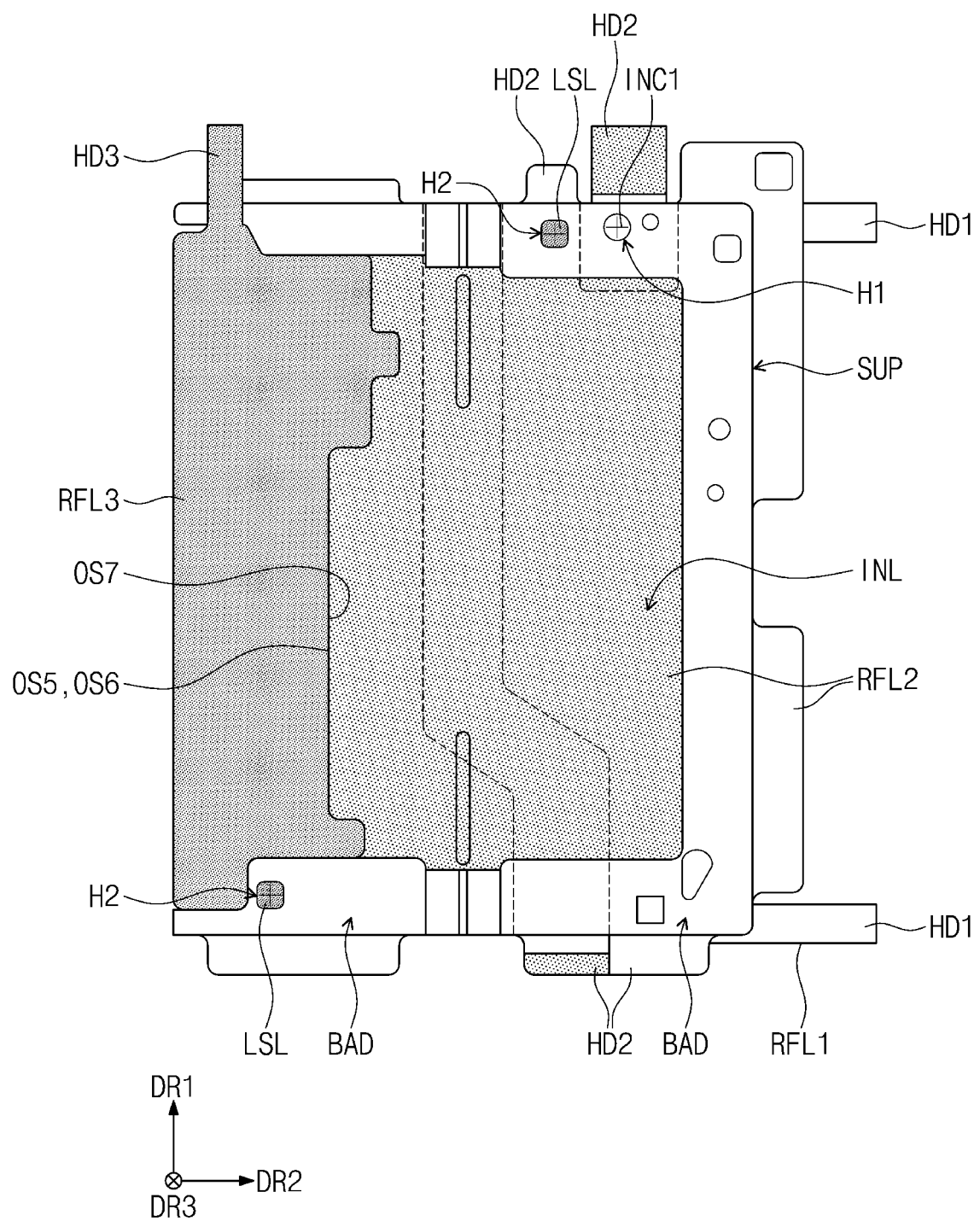
FIG. 7 illustrates a plan view showing the supporter depicted in FIG. 3 and a second release film below the supporter.

FIG. 7 illustrates a plan view showing the supporter depicted in FIG. 3 and the second release film below the supporter.

By way of example, the insulation layer INL and the border adhesive layer BAD are illustrated to have their shapes aligned with those of the second and third release films RFL2 and RFL3 below which the insulation layer INL and the border adhesive layer BAD are located. FIG. 3 will also be referenced below, as needed.

Referring to FIGS. 3 and 7, the second and third release films RFL2 and RFL3 may cover the lower portion of the supporter SUP. The second and third release films RFL2 and RFL3 may cover the insulation layer INL and the border adhesive layer BAD.

The third release film RFL3 may be adjacent to the second release film RFL2 in the second direction DR2. The side OS7 of the third release film RFL3 may be adjacent to the sides OS5 and OS6 of the second release film RFL2.

When viewed in a plan view, the sum total of areas of the second and third release films RFL2 and RFL3 may be greater than an area of the supporter SUP. When viewed in a plan view, the second and third release films RFL2 and RFL3 may respectively include second and third handlers HD2 and HD3 that outwardly protrude beyond the supporter SUP.

The second release film RFL2 may include a plurality of second handlers HD2 that outwardly protrude beyond the supporter SUP. The second handlers HD2 may be suitably used to remove the second release film RFL2.

The third release film RFL3 may be adjacent to the second release film RFL2 in the second direction DR2. The third release film RFL3 may include a plurality of third handlers HD3 that outwardly protrude beyond the supporter SUP. The third handlers HD3 may be suitably used to remove the third release film RFL3.

The second release film RFL2 may have a first cut region INC1 defined therein to overlap the first hole H1. The second release film RFL2 may be provided thereon with a plurality of light-shield layers LSL that overlap the second holes H2. The first cut region INC1 and the light-shield layers LSL will be further discussed below in detail.

Figure 8:
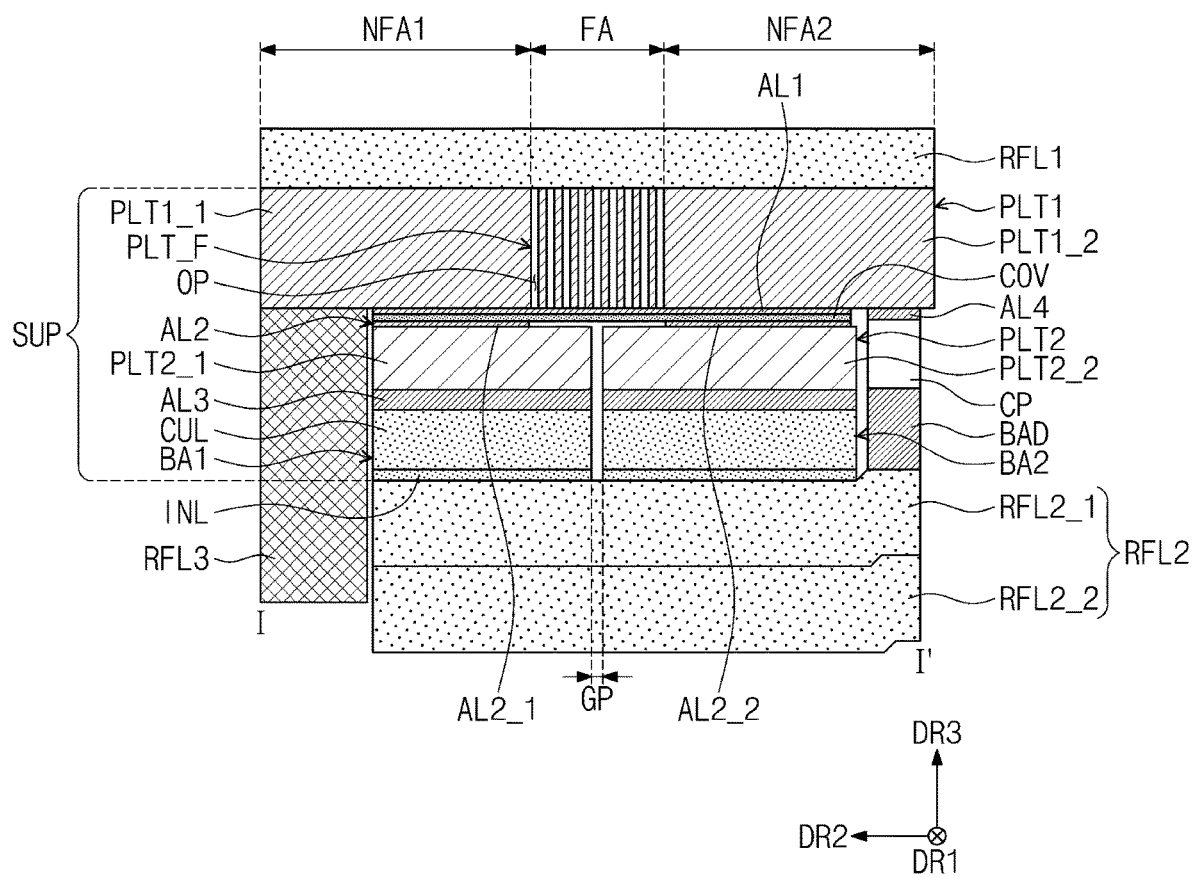
FIG. 8 illustrates a cross-sectional view taken along the line I-I' depicted in FIG. 6.

FIG. 8 illustrates a cross-sectional view taken along the line I-I' depicted in FIG. 6.

Referring to FIG. 8, the first release film RFL1 may be provided on and protect the first plate PLT1.

When viewed in a plan view, the first_first plate PLT1_1 may overlap the first non-folding area NFA1. When viewed in a plan view, the first_second plate PLT1_2 may overlap the second non-folding area NFA2. When viewed in a plan view, the folding plate PLT_F may overlap the folding area FA.

The cover layer COV below the first plate PLT1 may cover the openings OP defined by the first plate PLT1. A first adhesive layer AL1 may be between the cover layer COV and the first plate PLT1, and the first adhesive layer AL1 may attach the cover layer COV to the first plate PLT1. The cover layer COV may reduce or prevent the introduction of foreign substances into the openings OP defined by the first plate PLT1.

The second plate PLT2 may be below the cover layer COV, and a second adhesive layer AL2 may be between the cover layer COV and the second plate PLT2. The second adhesive layer AL2 may attach the cover layer COV to the second plate PLT2. When viewed in a plan view, the second adhesive layer AL2 might not overlap the folding area FA.

The second adhesive layer AL2 may include a first part AL2_1 and a second part AL2_2. When viewed in a plan view, the first part AL2_1 may overlap the first non-folding area NFA1, and the second part AL2_2 may overlap the second non-folding area NFA2. In some embodiments, neither the first part AL2_1 nor the second part AL2_2 overlaps the folding area FA. The second adhesive layer AL2 may be absent on a region that corresponds to the folding area FA, and thus the cover layer COV may increase in flexibility.

When viewed in a plan view, the second plate PLT2 may include a second_first plate PLT2_1 that overlaps the first non-folding area NFA1 and a second_second plate PLT2_2 that overlaps the second non-folding area NFA2.

On the basis of the second direction DR2, the second_first plate PLT2_1 and the second_second plate PLT2_2 may have therebetween a gap GP that is less than an interval between the first part AL2_1 and the second part AL2_2. For example, the gap GP may be smaller than a length of the folding area FA.

When viewed in a plan view, the gap GP between the second_first plate PLT2_1 and the second_second plate PLT2_2 may overlap the folding area FA. For example, the gap GP between the second_first plate PLT2_1 and the second_second plate PLT2_2 may range from about 0.3 mm to about 3 mm.

The cushion layer CUL may be below the second plate PLT2, and a third adhesive layer AL3 may be between the second plate PLT2 and the cushion layer CUL. The third adhesive layer AL3 may attach the second plate PLT2 to the cushion layer CUL.

The insulation layer INL formed of a dielectric tape may be attached below the cushion layer CUL. Each of the cushion layer CUL, the third adhesive layer AL3, and the insulation layer INL may include two respective segments that are separated from each other across the gap GP.

The third release film RFL3 may be below the first plate PLT1. The third release film RFL3 may be adjacent to one side of the first plate PLT1. The third release film RFL3 may be adjacent to a first edge BA1 of each of the cover layer COV, the second plate PLT2, the cushion layer CUL, and the insulation layer INL. The first edges BA1 of the cover layer COV, the second plate PLT2, the cushion layer CUL, and the insulation layer INL may correspond to the sides OS1, OS2, OS3, and OS4 depicted in FIG. 3.

A step compensation layer CP may be below the first plate PLT1, and a fourth adhesive layer AL4 may be between the step compensation layer CP and the first plate PLT1. The fourth adhesive layer AL4 may attach the step compensation layer CP to the first plate PLT1.

The border adhesive layer BAD may be below the step compensation layer CP. The border adhesive layer BAD and the first, second, third, and fourth adhesive layers AL1, AL2, AL3, and AL4 may include a pressure sensitive adhesive (PSA) or an optically clear adhesive (OCA), but no limitation is imposed on the type of adhesive.

The fourth adhesive layer AL4, the step compensation layer CP, and the border adhesive layer BAD may be adjacent to other side of the first plate PLT1. The step compensation layer CP and the border adhesive layer BAD may be adjacent to a second edge BA2 of each of the cover layer COV, the second plate PLT2, the cushion layer CUL, and the insulation layer INL.

The cover layer COV, the second plate PLT2, the cushion layer CUL, and the insulation layer INL may be between the third release film RFL3 and the step compensation layer CP, and between the third release film RFL3 and the border adhesive layer BAD.

The second release film RFL2 may be below the insulation layer INL and the border adhesive layer BAD. The first sub-release film RFL2_1 may be below the insulation layer INL and the border adhesive layer BAD. The second sub-release film RFL2_2 may be below the first sub-release film RFL2_1.

In some embodiments, a silicon adhesive may be between the first sub-release film RFL2_1 and the second sub-release film RFL2_2. In this case, the second sub-release film RFL2_2 may be suitably detachably attached to the first sub-release film RFL2_1.

The third release film RFL3 may be adjacent to the second release film RFL2. When viewed in a plan view, the third release film RFL3 might not overlap the second release film RFL2.

The first plate PLT1 may have a thickness that is greater than that of each of the second plate PLT2 and the cushion layer CUL. Each of the cover layer COV and the insulation layer INL may have a thickness that is less than that of each of the second plate PLT2 and the cushion layer CUL. The thickness may be defined to refer to a value measured in the third direction DR3.

The first release film RFL1 may have a thickness that is less than that of the first plate PLT1. The second release film RFL2 may have a thickness that is greater than that of the first plate PLT1. For example, the thickness of the first release film RFL1 may be about 82 μm. The thickness of the second release film RFL2 may be about 508 μm. The third release film RFL3 may have a thickness that is greater than that of the first plate PLT1.

Figure 9:
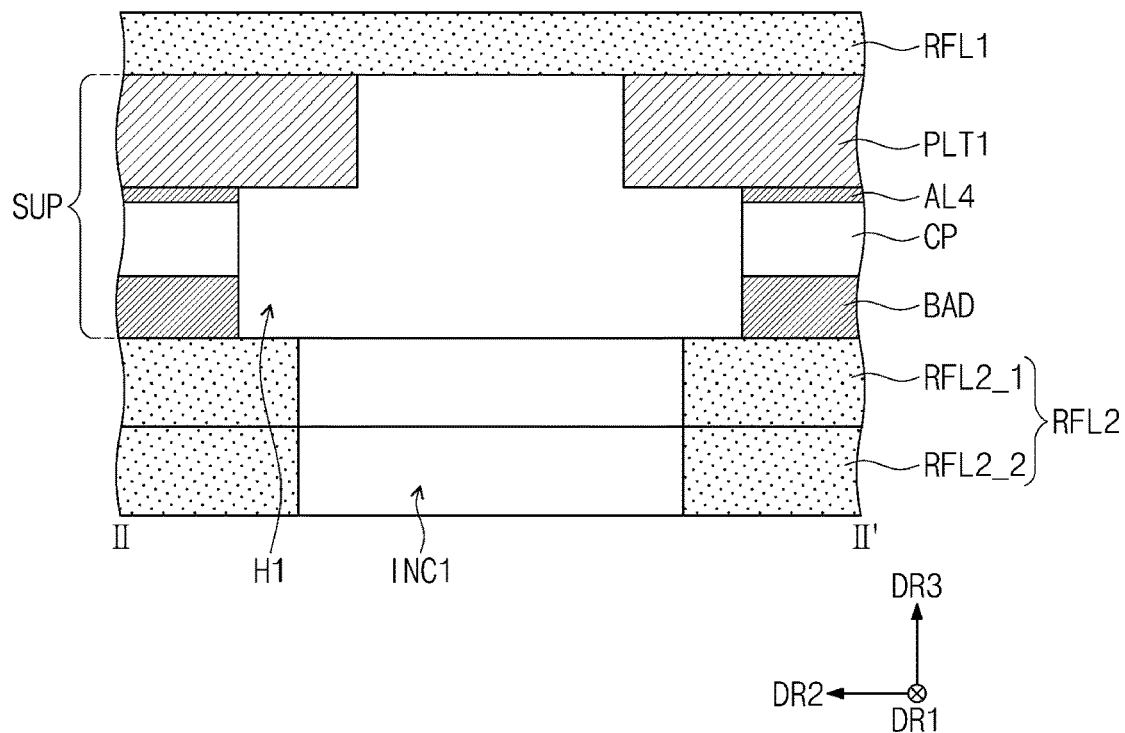
FIG. 9 illustrates a cross-sectional view taken along the line II-II' depicted in FIG. 6.
Figure 10:
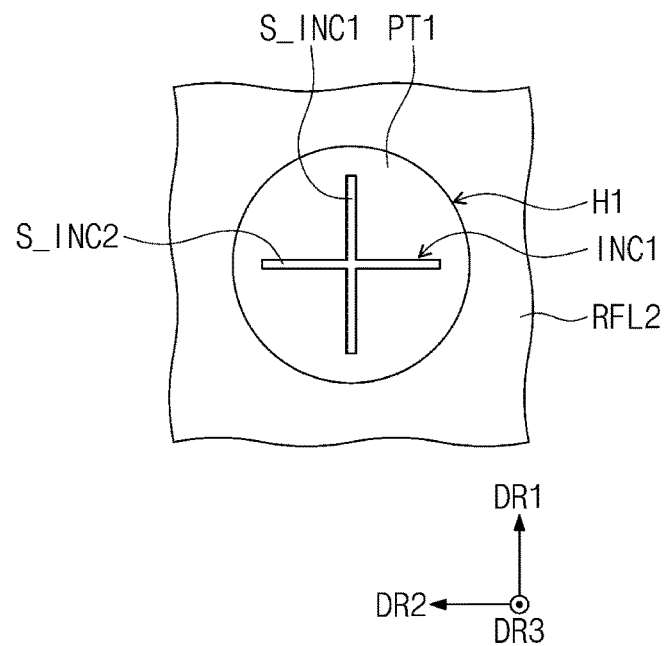
FIG. 10 illustrates a plan view showing a portion of a second release film that overlaps a first hole depicted in FIG. 9.

FIG. 9 illustrates a cross-sectional view taken along the line II-II' depicted in FIG. 6, and FIG. 10 illustrates a plan view showing a portion of the second release film that overlaps the first hole depicted in FIG. 9.

Referring to FIGS. 9 and 10, the supporter SUP may have the first hole H1 defined therein. Above the supporter SUP, the first release film RFL1 may cover the first hole H1. Below the supporter SUP, the second release film RFL2 may cover the first hole H1.

The first hole H1 may be defined by the border adhesive layer BAD, the step compensation layer CP, the fourth adhesive layer AL4, and the first plate PLT1. On the basis of the first and second directions DR1 and DR2, a width of the first hole H1 defined by the border adhesive layer BAD, the step compensation layer CP, and the fourth adhesive layer AL4 may be greater than a width of the first hole H1 defined by the first plate PLT1.

When viewed in a plan view, the second release film RFL2 may include a first part PT1 that overlaps the first hole H1, and the first cut region INC1 may be defined in, or defined by, the first part PT1 of the second release film RFL2. The first cut region INC1 may have a cross shape. The first cut region INC1 may be defined in the first and second sub-release films RFL2_1 and RFL2_2.

The first cut region INC1 may include a first sub-cut region S_INC1 that extends in the first direction DR1, and a second sub-cut region S_INC2 that extends in the second direction DR2. The second sub-cut region S_INC2 may cross the first sub-cut region S_INC1. The first sub-cut region S_INC1 and the second sub-cut region S_INC2 may cross each other, and may be defined into a single unitary body to form the first cut region INC1 having a cross shape.

The first cut region INC1 may be defined as an air pathway. The following description will focus on the function of the first cut region INC1.

Figure 11A:
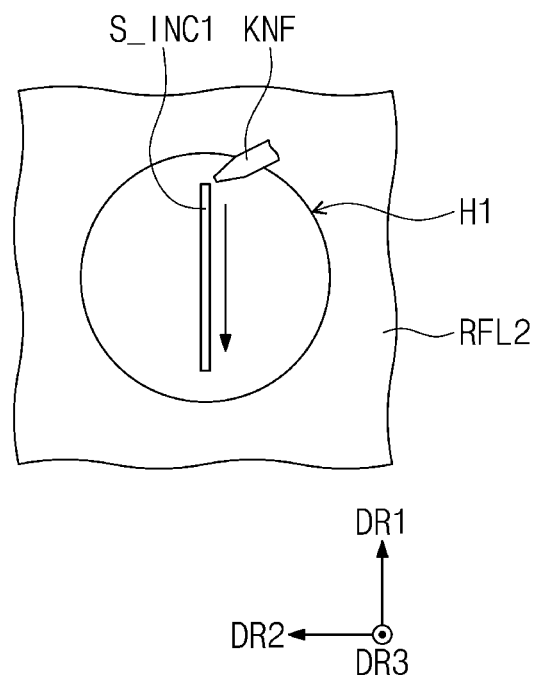
FIGS. 11A and 11B illustrate plan views showing a method of forming a first cut region depicted in FIG. 10.
Figure 11B:
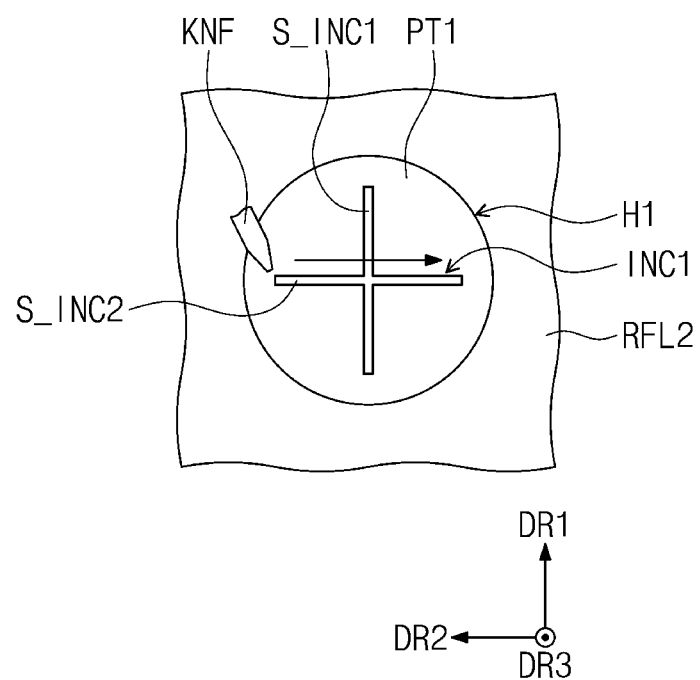

FIGS. 11A and 11B illustrate plan views showing a method of forming the first cut region depicted in FIG. 10.

Referring to FIG. 11A, a knife KNF (or cutting device) may be prepared, and the knife KNF may move along the first direction DR1 to cut the first part PT1 of the second release film RFL2. Therefore, the first sub-cut region S_INC1 may be formed on the first part PT1. For example, the first sub-cut region S_INC1 may be about 3 mm long.

Referring to FIG. 11B, the knife KNF may move along the second direction DR2 to cut the first part PT1 of the second release film RFL2. Therefore, the second sub-cut region S_INC2 may be formed on the first part PT1. The knife KNF may move to cross the first sub-cut region S_INC1, and thus the second sub-cut region S_INC2 may be formed on the first part PT1. For example, the second sub-cut region S_INC2 may be about 3 mm long.

Figure 12:
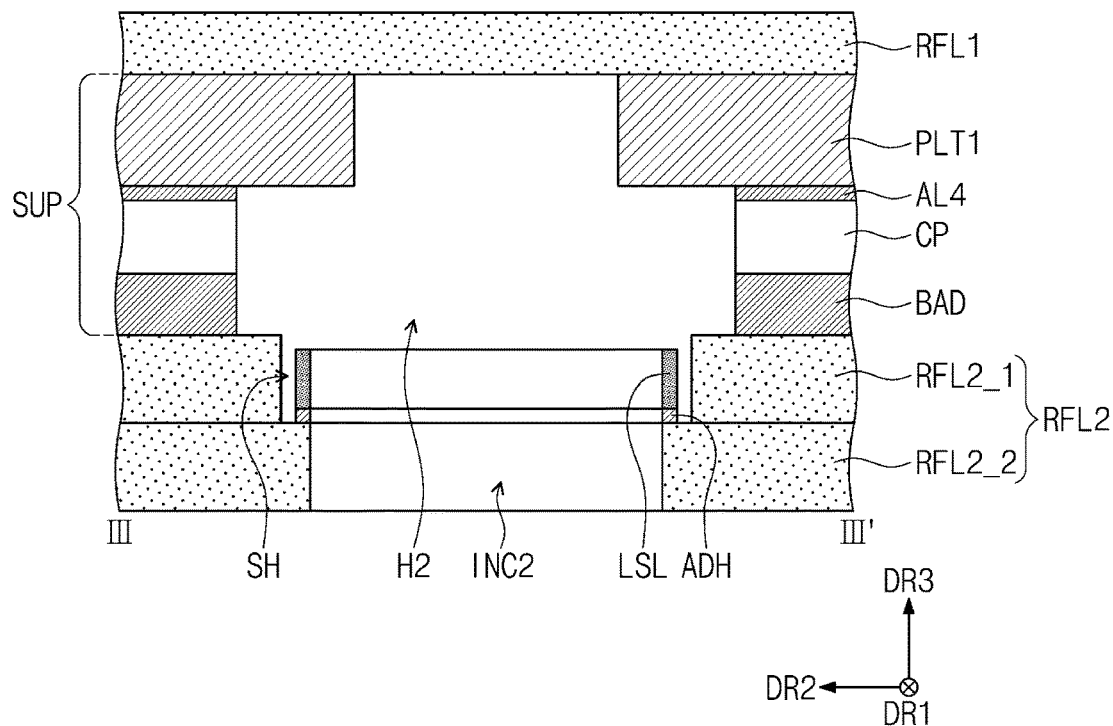
FIG. 12 illustrates a cross-sectional view taken along the line III-III' depicted in FIG. 6.
Figure 13:
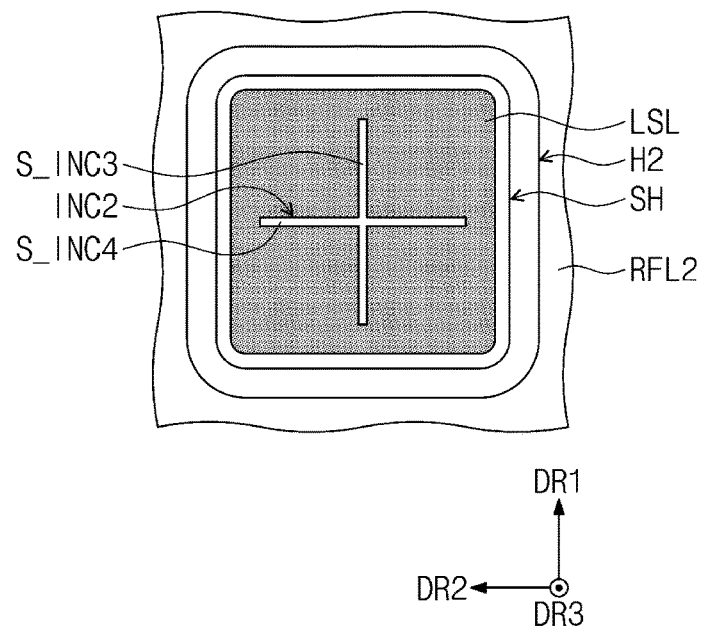
FIG. 13 illustrates a plan view showing a portion of a second release film that overlaps a second hole depicted in FIG. 12.

FIG. 12 illustrates a cross-sectional view taken along the line III-III' of FIG. 6, and FIG. 13 illustrates a plan view showing a portion of the second release film that overlaps the second hole depicted in FIG. 12.

Referring to FIGS. 12 and 13, the supporter SUP may have the second hole H2 defined therein. Above the supporter SUP, the first release film RFL1 may cover the second hole H2. Below the supporter SUP, the second release film RFL2 may cover the second hole H2.

The second hole H2 may be defined in or by the border adhesive layer BAD, the step compensation layer CP, the fourth adhesive layer AL4, and the first plate PLT1. On the basis of the first and second directions DR1 and DR2, a width of the second hole H2 defined by the border adhesive layer BAD, the step compensation layer CP, and the fourth adhesive layer AL4 may be greater than a width of the second hole H2 defined by the first plate PLT1.

When viewed in a plan view, a second cut region INC2 may be defined in a part of the second release film RFL2 that overlaps the second hole H2. The second cut region INC2 may have a cross shape.

The second cut region INC2 may include a third sub-cut region S_INC3 that extends in the first direction DR1, and a fourth sub-cut region S_INC4 that extends in the second direction DR2. The fourth sub-cut region S_INC4 may cross the third sub-cut region S_INC3. The third sub-cut region S_INC3 and the fourth sub-cut region S_INC4 may cross each other, and may be defined into a single unitary body to form the second cut region INC2 having a cross shape. For example, each of the third and fourth sub-cut regions S_INC3 and S_INC4 may be about 3 mm long.

The second cut region INC2 may be formed by substantially the same method as that used for forming the first cut region INC1. The second cut region INC2 may be defined as an air pathway. The following description will focus on the function of the second cut region INC2.

The release film RFL may further include the light-shield layer LSL on one surface of the second sub-release film RFL2_2. The light-shield layer LSL may be on a top surface of the second sub-release film RFL2_2. The light-shield layer LSL may be provided in the form of a film, and may be attached through an adhesive ADH to the top surface of the second sub-release film RFL2_2. The light-shield layer LSL may be black to block light. The adhesive ADH may include a pressure sensitive adhesive.

The second cut region INC2 may be defined in the light-shield layer LSL, the adhesive ADH, and the second sub-release film RFL2_2. The first sub-release film RFL2_1 may include a portion that overlaps the second hole H2, and the light-shield layer LSL may be in a sub-hole SH defined by the portion of the first sub-release film RFL2_1.

Figure 14:
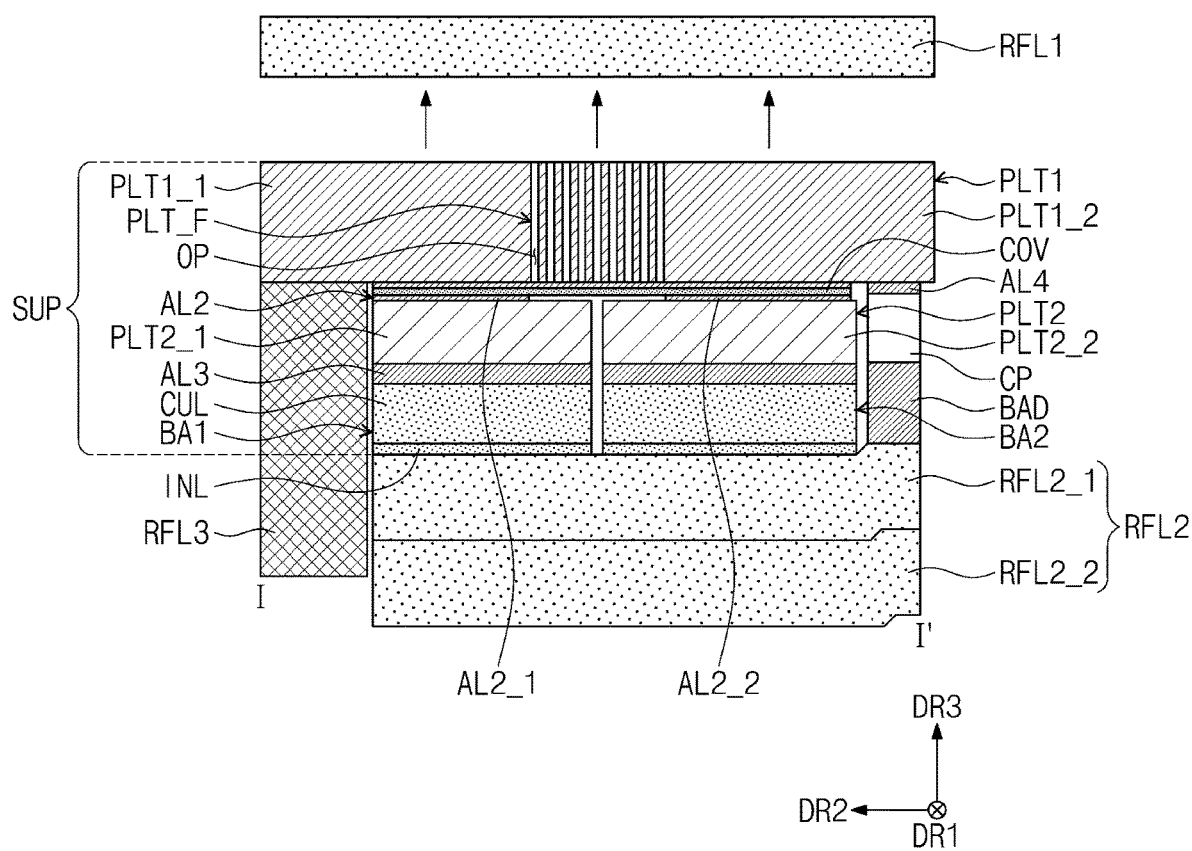
FIGS. 14 and 15 illustrate cross-sectional views showing a process in which a display module is attached to the supporter depicted in FIG. 8.
Figure 15:
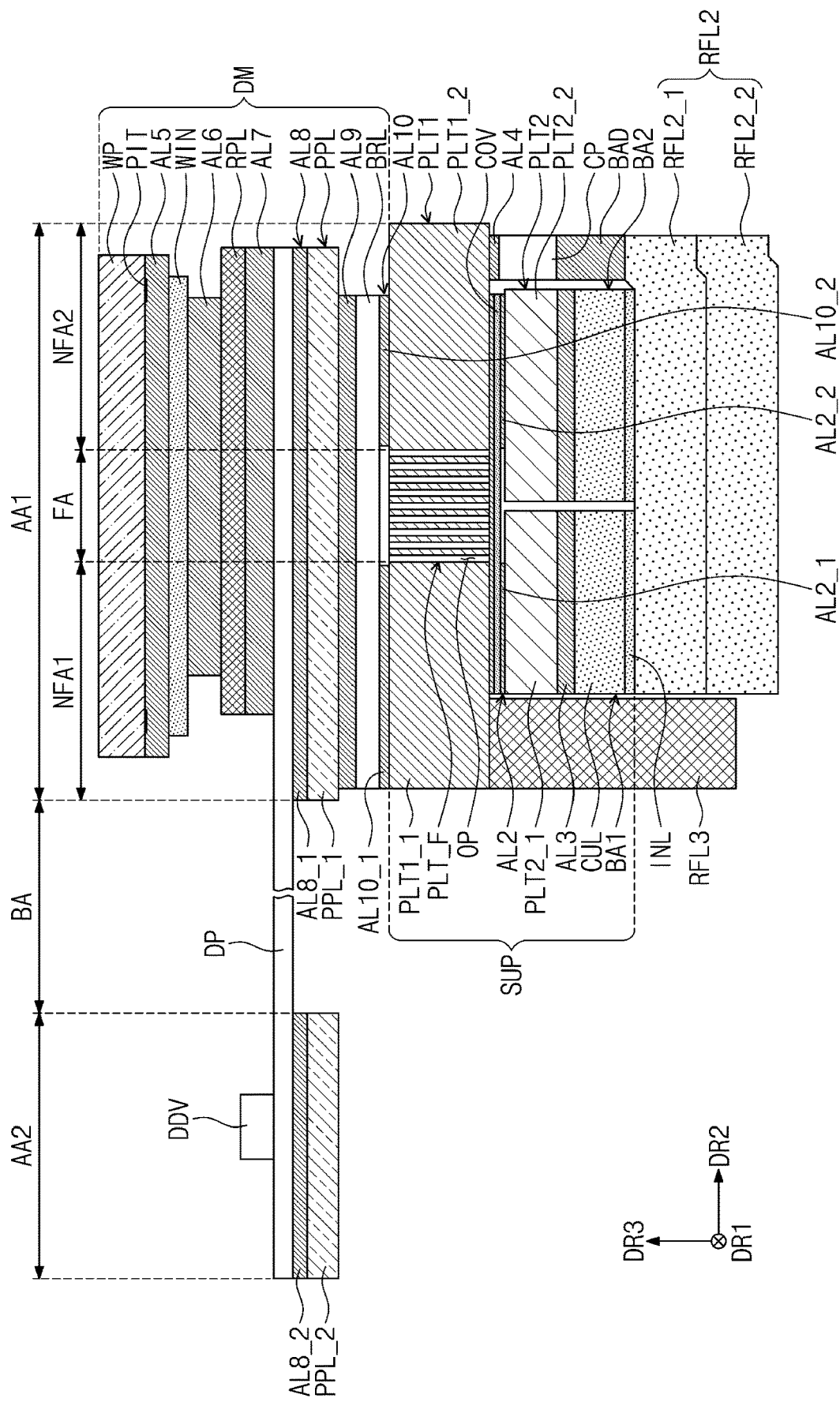

FIGS. 14 and 15 illustrate cross-sectional views showing a process in which a display module is attached to the supporter depicted in FIG. 8.

Referring to FIG. 14, the first release film RFL1 may be removed from the supporter SUP.

Referring to FIG. 15, a display module DM may be attached to the supporter SUP. The display module DM may be attached to a top surface of the first plate PLT1. The first plate PLT1 may support the display module DM. The first plate PLT1 and the second plate PLT2 may allow the display module DM to have increased heat-radiation performance.

The second_first plate PLT2_1 may support the first non-folding area NFA1. The second_second plate PLT2_2 may support the second non-folding area NFA2. The second_first plate PLT2_1 and the second_second plate PLT2_2 may extend toward the folding area FA, and may thus be adjacent to each other at or near the folding area FA.

On the folding area FA, the second_first plate PLT2_1 and the second_second plate PLT2_2 may support the folding plate PLT_F in which the openings OP are defined. When pressure is downwardly applied to the folding plate PLT_F, the second_first plate PLT2_1 and the second_second plate PLT2_2 may prevent or partially prevent the folding plate PLT_F from being partially deformed.

The display module DM may include a display panel DP, an antireflection layer RPL, a window WIN, a window protection layer WP, a panel protection layer PPL, a barrier layer BRL, and fifth to tenth adhesive layers AL5 to AL10. The antireflection layer RPL, the window WIN, and the window protection layer WP may be on or above the display panel DP. The panel protection layer PPL and the barrier layer BRL may be below the display panel DP.

The display panel DP may include a plurality of pixels for displaying images. The display panel DP may be a flexible display panel. For example, the display panel DP may include a plurality of electronic elements on a flexible substrate.

An emissive display panel may be adopted as the display panel DP according to some embodiments of the present disclosure. For example, the display panel DP may be an organic light emitting display panel or a quantum-dot light emitting display panel. An emission layer of the organic light emitting display panel may include an organic light emitting material. An emission layer of the quantum-dot light emitting display panel may include a quantum-dot or a quantum-rod. The following will describe an example in which an organic light emitting display panel is used as the display panel DP.

The display panel DP may include a first area AA1, a second area AA2, and a bending area BA between the first and second areas AA1 and AA2. A data driver DDV may be on the second area AA2.

The antireflection layer RPL may be on the display panel DP. The antireflection layer RPL may be defined as a film for reducing or preventing reflection of external light. The antireflection layer RPL may reduce a reflectance of light externally incident on the display panel DP.

When a user is provided again with external light that travels toward, and is reflected from, the display panel DP, like a mirror effect, the external light may be visible to the user. To reduce or prevent effects of the phenomenon above, the antireflection layer RPL may include a plurality of color filters that display the same colors as those generated from the pixels.

The color filters may be configured such that the external light is filtered into the same colors as those generated from the pixels. In this case, the external light might not be visible to users. The present disclosure, however, is not limited thereto, and the antireflection layer RPL may include one or more of a retarder and a polarizer.

The window WIN may be on the antireflection layer RPL. The window WIN may protect the display panel DP and the antireflection layer RPL against external scratches. The window WIN may have optically transparent properties.

The window WIN may include glass. The window WIN may be defined as ultrathin glass (UTG). The present disclosure, however, is not limited thereto, and the window WIN may include a synthetic resin film.

The window WIN may have a single-layered or multi-layered structure. For example, the window WIN may include either a plurality of synthetic resin films that are coupled to each other through an adhesive, or a glass substrate with a plastic film coupled thereto through an adhesive.

The window protection layer WP may be on the window WIN. The window protection layer WP may include a flexible plastic material, such as polyimide or polyethyleneterephthalate. In some embodiments, one or more of a hard coating layer, a fingerprint-proof layer, and an antireflection layer may be on a top surface of the window protection layer WP.

A print layer PIT may be on a bottom surface of the window protection layer WP. The print layer PIT may have a black color, but no limitation is imposed on the color of the print layer PIT. The print layer PIT may be adjacent to an edge of the window protection layer WP.

The fifth adhesive layer AL5 may be between the window protection layer WP and the window WIN. The fifth adhesive layer AL5 may attach the window protection layer WP to the window WIN. The fifth adhesive layer AL5 may cover the print layer PIT.

The sixth adhesive layer AL6 may be between the window WIN and the antireflection layer RPL. The sixth adhesive layer AL6 may attach the window WIN to the antireflection layer RPL.

The seventh adhesive layer AL7 may be between the antireflection layer RPL and the display panel DP. The seventh adhesive layer AL7 may attach the antireflection layer RPL to the display panel DP.

The panel protection layer PPL may be below the display panel DP. The panel protection layer PPL may protect a lower portion of the display panel DP. The panel protection layer PPL may include a flexible plastic material. For example, the panel protection layer PPL may include polyethyleneterephthalate (PET).

The panel protection layer PPL may include a first part PPL_1 below the first area AA1 and a second part PPL_2 below the second area AA2. The panel protection layer PPL might not be below the bending area BA.

The barrier layer BRL may be below the panel protection layer PPL. The barrier layer BRL may increase resistance to a compressive force caused by external suppression. Therefore, the barrier layer BRL may serve to reduce or prevent deformation of the display panel DP. The barrier layer BRL may include a flexible plastic material, such as polyimide or polyethyleneterephthalate.

The barrier layer BRL may have a light-absorbing color. The barrier layer BRL may have a black color. In this case, when viewed from above the display module DM, components below the barrier layer BRL may be effectively invisible to the user.

The eighth adhesive layer AL8 may be between the display panel DP and the panel protection layer PPL. The eighth adhesive layer AL8 may attach the display panel DP to the panel protection layer PPL. The eighth adhesive layer AL8 may include a first part AL8_1 below the first area AA1 and a second part AL8_2 below the second area AA2. The eighth adhesive layer AL8 might not be below the bending area BA.

The ninth adhesive layer AL9 may be between the barrier layer BRL and the first part PPL_1 of the panel protection layer PPL. The ninth adhesive layer AL9 may attach the barrier layer BRL to the first part PPL_1 of the panel protection layer PPL.

The tenth adhesive layer AL10 may be between the barrier layer BRL and the first plate PLT1. The tenth adhesive layer AL10 may attach the barrier layer BRL to the first plate PLT1.

When viewed in a plan view, the tenth adhesive layer AL10 may include a first part AL10_1 that overlaps the first non-folding area NFA1, and a second part AL10_2 that overlaps the second non-folding area NFA2. The tenth adhesive layer AL10 might not overlap the folding area FA. As the tenth adhesive layer AL10 is not on a section that overlaps the folding area FA, the first plate PLT1 may increase in flexibility.

The fifth to tenth adhesive layers AL5 to AL10 may include a transparent adhesive, such as a pressure sensitive adhesive (PSA) or an optically clear adhesive (OCA).

In some embodiments, the second and third release films RFL2 and RFL3 may be subsequently removed, and the border adhesive layer BAD may be attached to a set structure that accommodates the display module DM and the supporter SUP.

Figure 16:
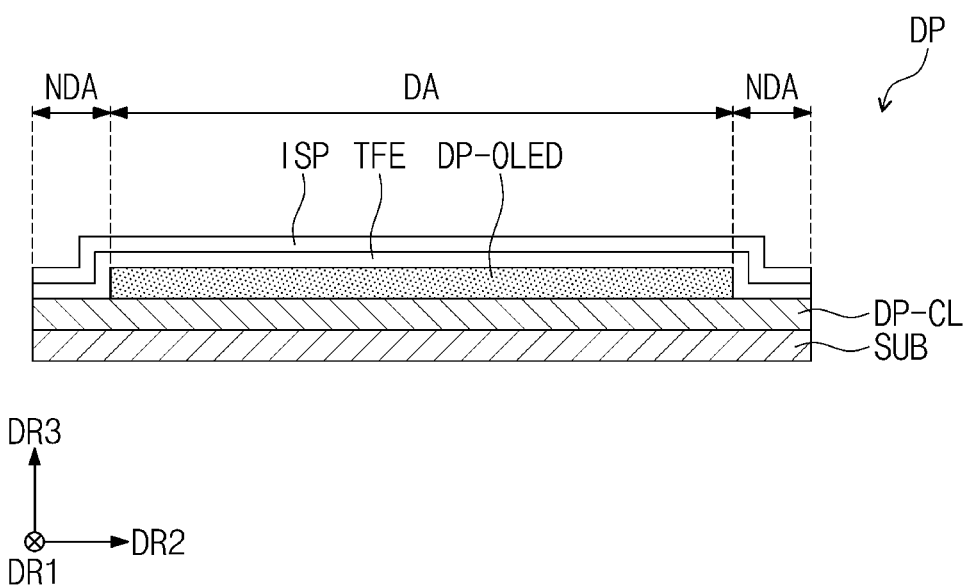
FIG. 16 illustrates a cross-sectional view showing a display panel depicted in FIG. 15.

FIG. 16 illustrates a cross-sectional view showing the display panel depicted in FIG. 15.

Referring to FIG. 16, the display panel DP may include a substrate SUB, a circuit element layer DP-CL on the substrate SUB, a display element layer DP-OLED on the circuit element layer DP-CL, a thin-film encapsulation layer TFE on the display element layer DP-OLED, and an input sensing part ISP on the thin-film encapsulation layer TFE. The display element layer DP-OLED may be on a display area DA which will be described below.

The substrate SUB may include a display area DA, and a non-display area NDA around the display area DA. The substrate SUB may include a flexible plastic material. For example, the substrate SUB may include polyimide (PI).

The circuit element layer DP-CL may include a dielectric layer, a semiconductor pattern, a conductive pattern, and a signal line. A coating or deposition process may form a dielectric layer, a semiconductor layer, and a conductive layer on the substrate SUB. Afterwards, a plurality of photolithography processes may be performed in which the dielectric layer, the semiconductor layer, and the conductive layer may be patterned to form the semiconductor pattern, the conductive pattern, and the signal line.

The circuit element layer DP-CL may include transistors formed of the semiconductor pattern, the conductive pattern, and the signal line. The display element layer DP-OLED may include light emitting elements connected to the transistors. The transistors and the light emitting elements may be included in pixels.

The thin-film encapsulation layer TFE may be on the circuit element layer DP-CL so as to cover the display element layer DP-OLED. The thin-film encapsulation layer TFE may include an inorganic layer, an organic layer, and an inorganic layer that are sequentially stacked. The inorganic layers may include an inorganic material, and may protect the pixels against moisture and/or oxygen. The organic layer may include an organic material, and may protect the pixels against foreign substances such as dust particles.

In some embodiments, the input sensing part ISP may include a plurality of sensors that detect an external input. The sensors may use a capacitive method to detect the external input. The external input may include a user's body part, light, heat, pen, pressure, or various other types of external input.

The input sensing part ISP may be directly fabricated on the thin-film encapsulation layer TFE when the display panel DP is manufactured. The present disclosure, however, is not limited thereto, and when the display panel DP is manufactured, the input sensing part ISP may be separately fabricated in the form of a panel and then attached to the display panel DP through an adhesive.

Figure 17:
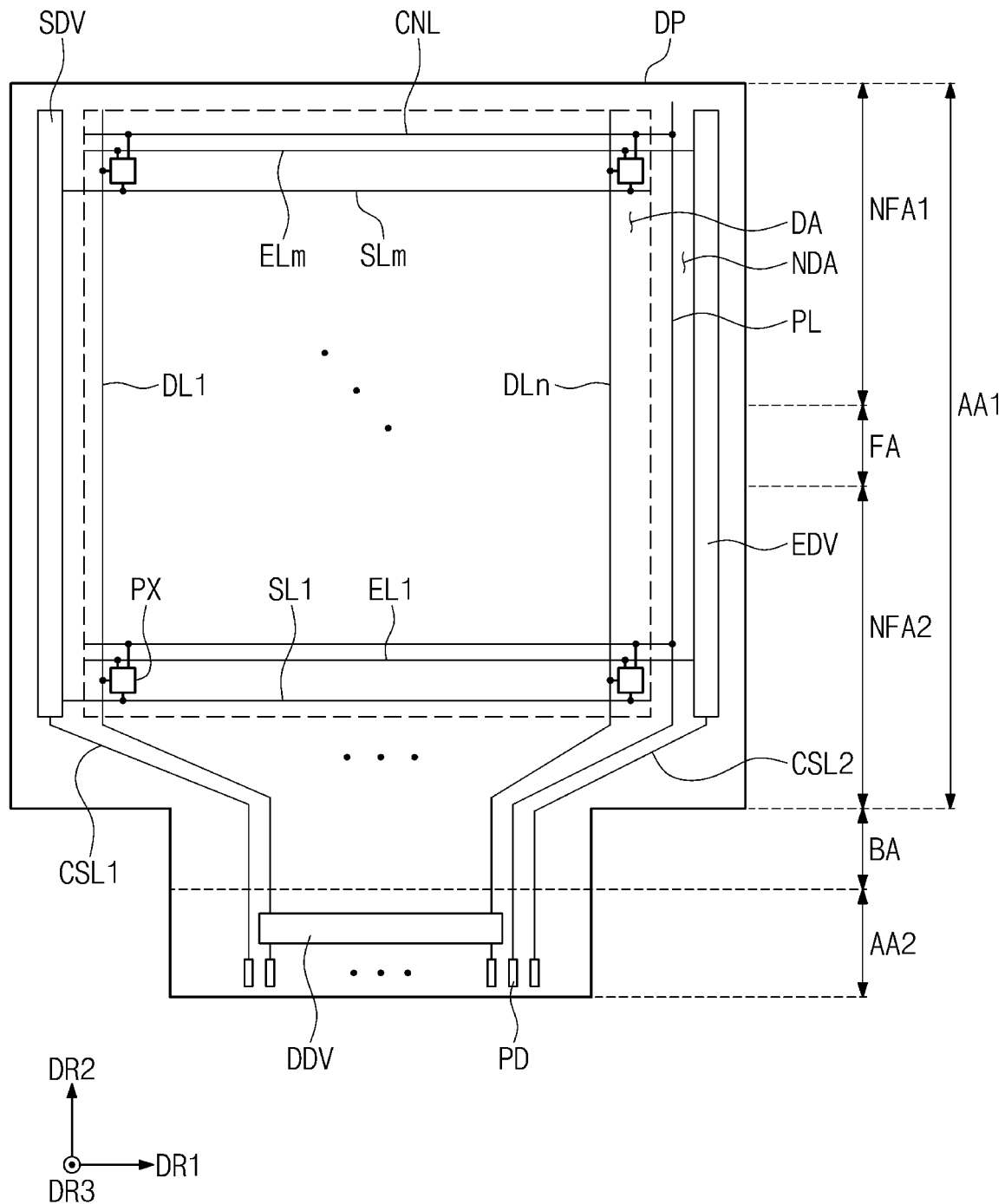
FIG. 17 illustrates a plan view showing the display panel depicted in FIG. 15.

FIG. 17 illustrates a plan view showing the display panel depicted in FIG. 15.

Referring to FIG. 17, a scan driver SDV, a data driver DDV, and an emission driver EDV may be on the display panel DP. The display panel DP may include a first area AA1, a second area AA2, and a bending area BA between the first and second areas AA1 and AA2. The bending area BA may extend in the first direction DR1, and the first area AA1, the bending area BA, and the second area AA2 may be arranged in the second direction DR2.

The first area AA1 may include the display area DA, and the non-display area NDA around the display area DA. The non-display area NDA may surround the display area DA (e.g., in a plan view). The display area DA may display images, and the non-display area NDA might not display images. Neither the second area AA2 nor the bending area BA displays images in some embodiments.

When viewed in the first direction DR1, the first area AA1 may include a first non-folding area NFA1, a second non-folding area NFA2, and a folding area FA between the first non-folding area NFA1 and the second non-folding area NFA2.

The display panel DP may include a plurality of pixels PX, a plurality of scan lines SL1 to SLm, a plurality of data lines DL1 to DLn, a plurality of emission lines EL1 to ELm, first and second control lines CSL1 and CSL2, a power line PL, connection lines CNL, and a plurality of pads PD. The subscripts "m" and "n" correspond to natural numbers. The pixels PX may be on the display area DA and connected to the scan lines SL1 to SLm, the data lines DL1 to DLn, and the emission lines EL1 to ELm.

The scan driver SDV and the emission driver EDV may be on the non-display area NDA, and may be adjacent to respective opposite sides of the first area AA1 that face each other in the first direction DR1. The data driver DDV may be on the second area AA2. The data driver DDV may be fabricated in the form of an integrated circuit chip, and may be mounted on the second area AA2.

The scan lines SL1 to SLm may extend in the first direction DR1 to come into connection with the scan driver SDV. The data lines DL1 to DLn may extend in the second direction DR2 to come into connection through the bending area BA with the data driver DDV. The emission lines EL1 to ELm may extend in the first direction DR1 to come into connection with the emission driver EDV.

The power line PL may extend in the second direction DR2 to be on the non-display area NDA. The power line PL may be between the display area DA and the emission driver EDV, or may between the display area DA and the scan driver SDV, but the present disclosure is not limited thereto.

The power line PL may extend through the bending area BA toward the second area AA2. When viewed in a plan view, the power line PL may extend toward a bottom end of the second area AA2. The power line PL may receive a driving voltage.

The connection lines CNL may extend in the first direction DR1 and may be arranged in the second direction DR2. The connection lines CNL may be connected to the power line PL and the pixels PX. The driving voltage may be applied to the pixels PX through the power line PL and the connection lines CNL.

The first control line CSL1 may be connected to the scan driver SDV, and may extend through the bending area BA toward the bottom end of the second area AA2. The second control line CSL2 may be connected to the emission driver EDV, and may extend through the bending area BA toward the bottom end of the second area AA2. The data driver DDV may be between the first control line CSL1 and the second control line CSL2.

When viewed in a plan view, the pads PD may be adjacent to the bottom end of the second area AA2. The data driver DDV, the power line PL, the first control line CSL1, and the second control line CSL2 may be connected to the pads PD.

The data lines DL1 to DLn may be connected through the data driver DDV to corresponding pads PD. For example, the data lines DL1 to DLn may be connected to the data driver DDV, and the data driver DDV may be connected to the pads PD that correspond to the data lines DL1 to DLn.

In some embodiments, there may be provided a printed circuit board connected to the pads PD. A timing controller and a voltage generator may be on the printed circuit board. The timing controller may be fabricated in the form of an integrated circuit chip, and may be mounted on the printed circuit board. The timing controller and the voltage generator may be connected through the printed circuit board to the pads PD.

The timing controller may control operations of the scan driver SDV, the data driver DDV, and the emission driver EDV. In response to externally received control signals, the timing controller may generate a scan control signal, a data control signal, and an emission control signal. The voltage generator may generate a driving voltage.

The scan control signal may be provided through the first control line CSL1 to the scan driver SDV. The emission control signal may be provided through the second control line CSL2 to the emission driver EDV. The data control signal may be provided to the data driver DDV. The timing controller may receive image signals from the outside (e.g., externally supplied image signals), and may convert data formats of the image signals to match an interface specification of the data driver DDV, and then may provide the data driver DDV with the converted image signals.

In response to the scan control signal, the scan driver SDV may generate a plurality of scan signals. The scan signals may be applied through the scan lines SL1 to SLm to the pixels PX. The scan signals may be sequentially applied to the pixels PX. In response to the data control signal, the data driver DDV may generate a plurality of data voltages that correspond to the image signals. The data voltages may be provided through the data lines DL1 to DLn to the pixels PX. In response to the emission control signal, the emission driver EDV may generate a plurality of emission signals. The emission signals may be applied through the emission lines EU to ELm to the pixels PX.

In response to the scan signals, the data voltages may be provided to the pixels PX. In response to the emission signals, the pixels PX may emit light corresponding to the data voltages, thereby displaying images. The emission signals may control light emission timing of the pixels PX.

Figure 18:
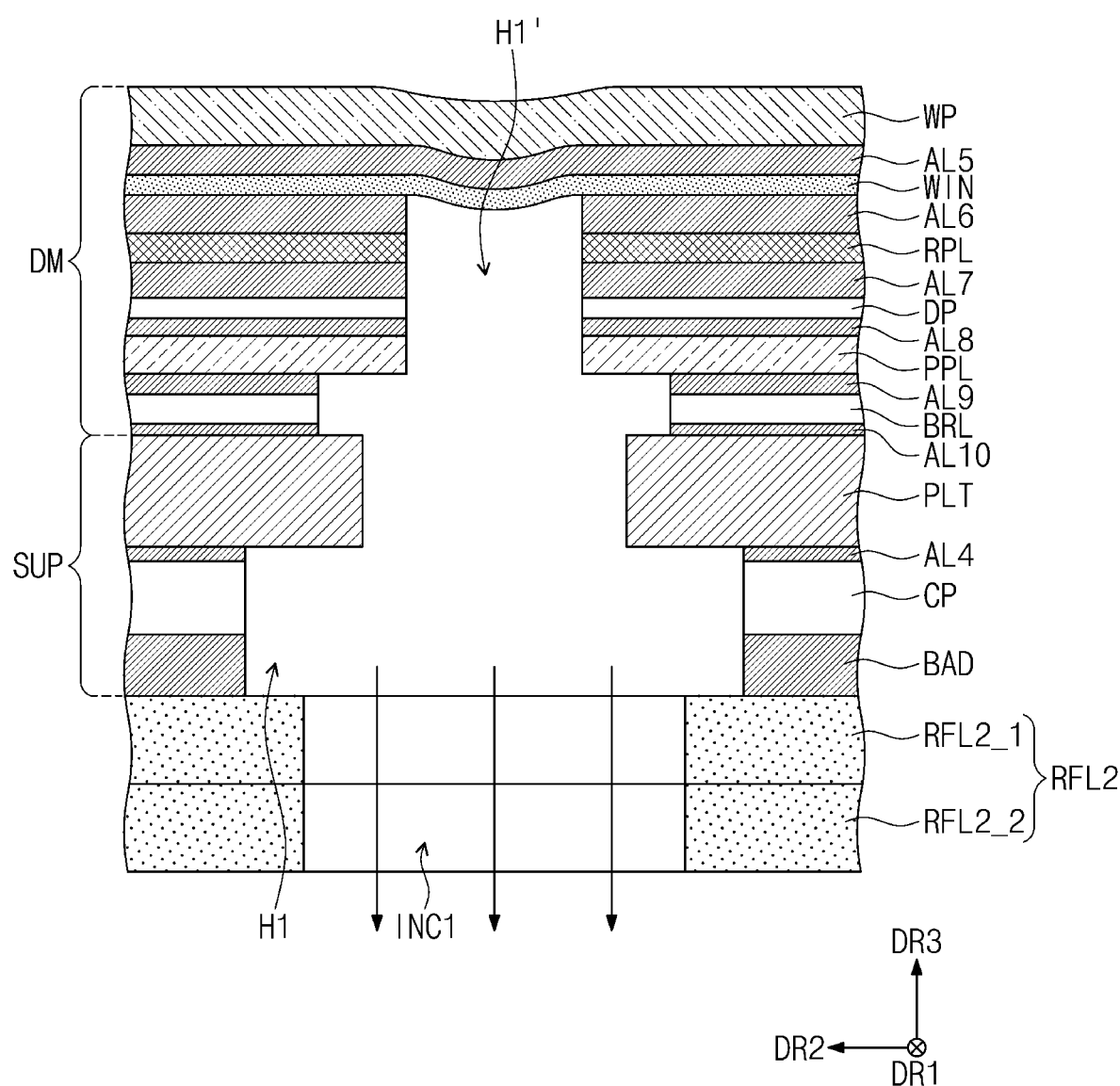
FIGS. 18 and 19 illustrate cross-sectional views showing deformed states of portions of display modules that respectively correspond to first and second holes when the display module is attached to a supporter.
Figure 19:
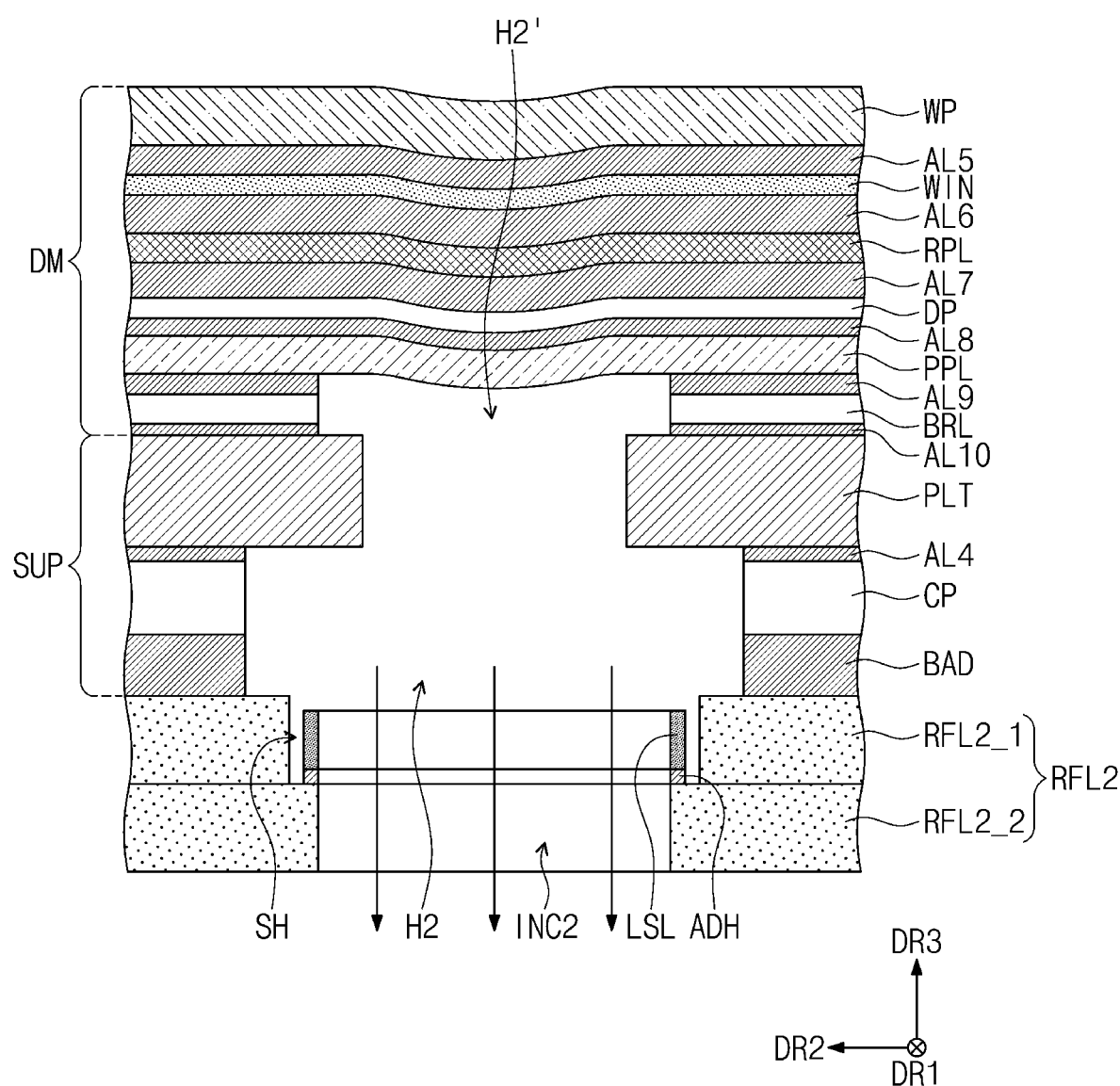
Figure 20:
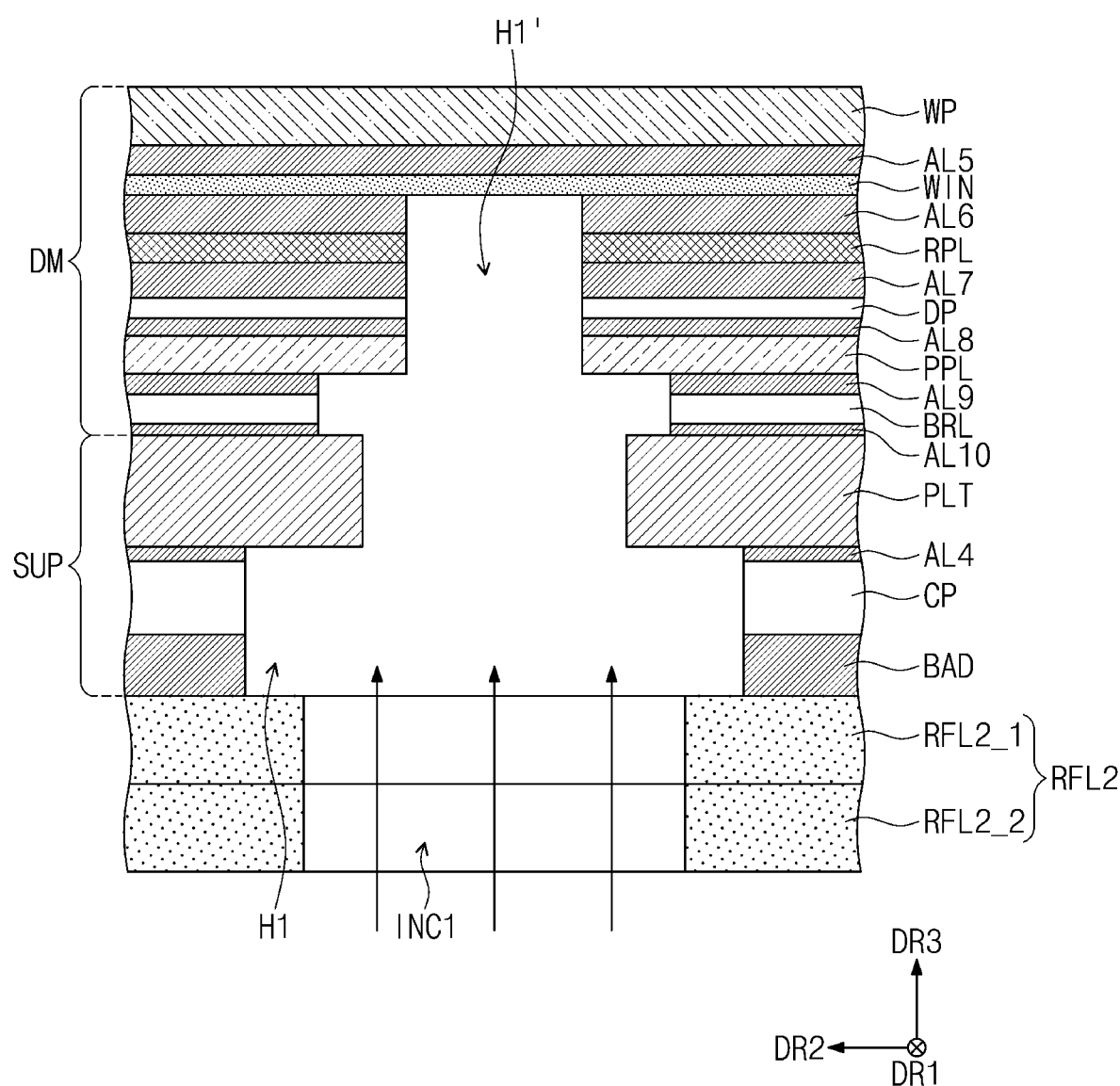
FIGS. 20 and 21 illustrate cross-sectional views showing restored states of portions of the display modules depicted in FIGS. 18 and 19, respectively.
Figure 21:
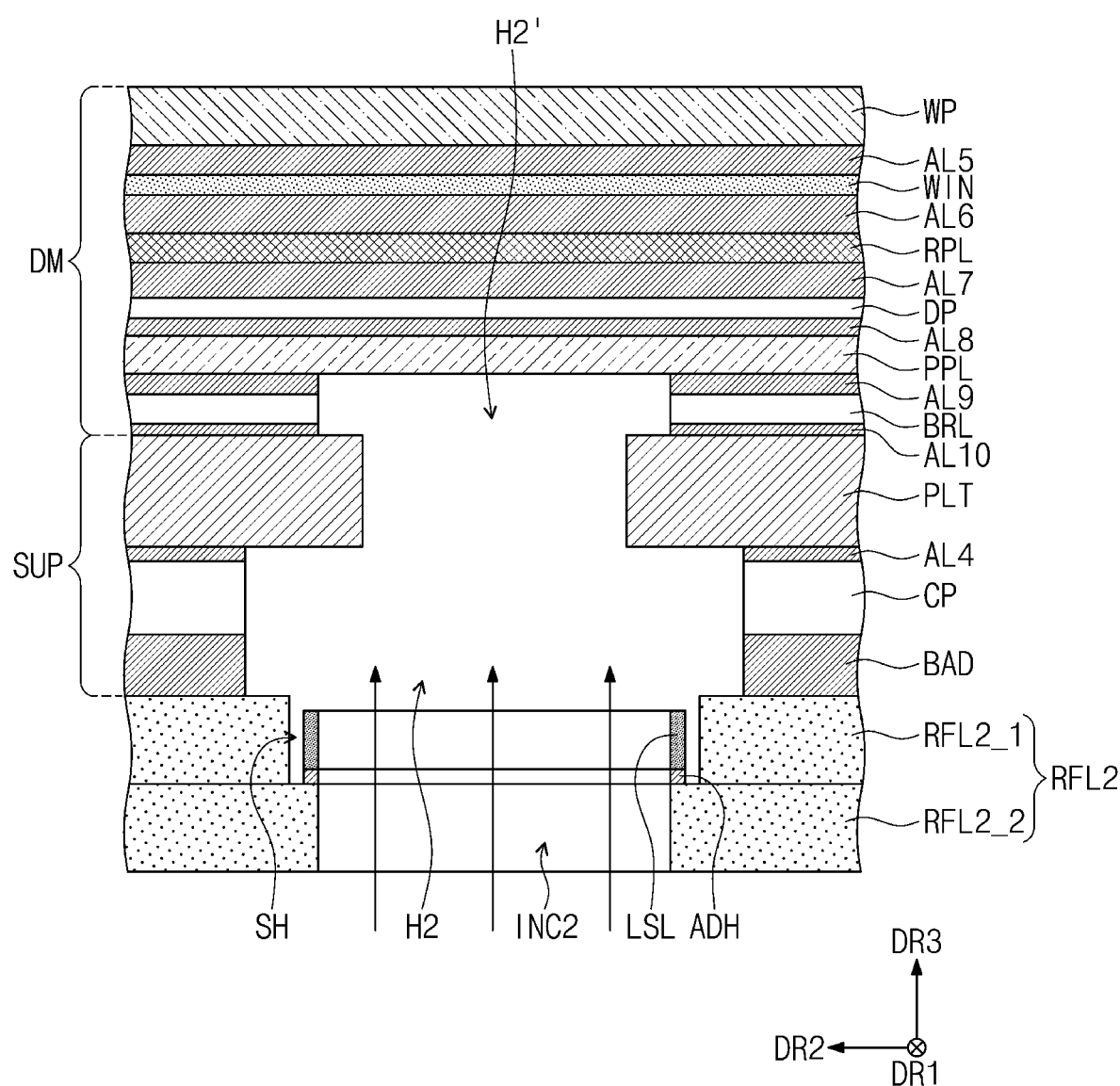

FIGS. 18 and 19 illustrate cross-sectional views showing deformed states of portions of display modules that respectively correspond to first and second holes when the display module is attached to a supporter, and FIGS. 20 and 21 illustrate cross-sectional views showing restored states of portions of the display modules depicted in FIGS. 18 and 19, respectively.

By way of example, FIGS. 18 and 20 show cross-sections that correspond to that of FIG. 9, and FIGS. 19 and 21 show cross-sections that correspond to that of FIG. 12.

Referring to FIG. 18, the display module DM may include a first hole H1' that corresponds to the first hole H1 defined by the supporter SUP. The first hole H1' may be defined below the window WIN. The first hole H1' may be defined by the antireflection layer RPL, the display panel DP, the panel protection layer PPL, the barrier layer BRL, and the sixth to tenth adhesive layers AL6 to AL10.

On the basis of the first and second directions DR1 and DR2, a width of the first hole H1' defined by the barrier layer BRL and the ninth and tenth adhesive layers AL9 and AL10 may be greater than a width of the first hole H1' defined by the antireflection layer RPL, the display panel DP, the panel protection layer PPL, and the sixth to eighth adhesive layers AL6 to AL8.

On the basis of the first and second directions DR1 and DR2, the width of the first hole H1' defined by the antireflection layer RPL, the display panel DP, the panel protection layer PPL, and the sixth to eighth adhesive layers AL6 to AL8 may be less than a width of the first hole H1 defined by the first plate PLT1.

On the basis of the first and second directions DR1 and DR2, the width of the first hole H1' defined by the barrier layer BRL and the ninth and tenth adhesive layers AL9 and AU 0 may be greater than the width of the first hole H1 defined by the first plate PLT1. The width of the first hole H1' defined by the barrier layer BRL and the ninth and tenth adhesive layers AL9 and AL10 may be less than a width of the first hole H1 defined by the border adhesive layer BAD, the step compensation layer CP, and the fourth adhesive layer AL4.

When viewed in a plan view, the first hole H1' may overlap the first hole H1. In some embodiments, the camera CAM may be placed in the first hole H1' and the first hole H1 in a subsequent process.

In some embodiments, the second release film RFL2 and the supporter SUP may be vacuum-adsorbed on a stage. Thereafter, when the display module DM is compressed toward and attached to the supporter SUP, a portion of the display module DM, which overlaps the first hole H1', may be recessed toward the first hole H1'. In this case, air may be externally discharged through the first cut region INC1 from the first holes H1' and H1.

Referring to FIG. 19, the display module DM may include a second hole H2' that corresponds to the second hole H2 defined by the supporter SUP. The second hole H2' may be defined below the panel protection layer PPL. The second hole H2' may be defined by the barrier layer BRL and the ninth and tenth adhesive layers AL9 and AL10.

On the basis of the first and second directions DR1 and DR2, a width of the second hole H2' defined by the barrier layer BRL and the ninth and tenth adhesive layers AL9 and AU 0 may be greater than a width of the second hole H2 defined by the first plate PLT1. The width of the second hole H2' defined by the barrier layer BRL and the ninth and tenth adhesive layers AL9 and AL10 may be less than a width of the second hole H2 defined by the border adhesive layer BAD, the step compensation layer CP, and the fourth adhesive layer AL4.

When viewed in a plan view, the second hole H2' may overlap the second hole H2. In some embodiments, the sensor SN may be placed in the second hole H2' and the second hole H2 in a subsequent process.

When the display module DM is compressed toward and attached to the supporter SUP, a portion of the display module DM that overlaps the second hole H2' may be recessed toward the second hole H2'. In this case, air may be externally discharged through the second cut region INC2 from the second holes H2' and H2.

Referring to FIGS. 20 and 21, after the display module DM is attached to the supporter SUP, external air may be provided through the first cut region INC1 to the first holes H1' and H1. Therefore, the portion of the display module DM that overlaps the first hole H1' may return to a flat state.

In addition, external air may be provided through the second cut region INC2 to the second holes H2' and H2. Therefore, the portion of the display module DM that overlaps the second hole H2' may return to a flat state.

When neither the first cut region INC1 nor the second cut region INC2 is formed, the second release film RFL2 may close, or seal, the first and second holes H1, H2, H1', and H2'. In this case, when the display module DM is compressed toward the supporter SUP, an air pressure formed in the first and second holes H1, H2, H1', and H2' might not allow attachment between the supporter SUP and a portion of the display module DM around the first and second holes H1' and H2'.

As air is discharged through the first and second cut regions INC1 and INC2, the first and second holes H1, H2, H1', and H2' may have a low air pressure. As a result, the display module DM may be normally attached to the supporter SUP.

When the display module DM is attached to the supporter SUP, portions of the display module DM on the first and second holes H1' and H2' may be recessed. However, after the display module DM is attached to the supporter SUP, air may be provided again through the first and second cut regions INC1 and INC2 to the first and second holes H1, H2, H1', and H2'. Therefore, the portions of the display module DM that overlap the first and second holes H1' and H2' may return to a flat state. In conclusion, there may be no deformation of the display module DM.

Referring to FIGS. 19 and 21, external light may pass through the second release film RFL2, and then may be provided through the second holes H2 and H2' to the display panel DP. The photoelectric effect led by light may change properties of elements on a portion of the display panel DP on the second holes H2 and H2'. In this case, when the display panel DP operates, there may occur a difference in brightness between the portion of the display panel DP on the second holes H2 and H2' and other portions of the display panel DP.

The light-shield layer LSL may block external light. As the light-shield layer LSL blocks external light, little or no external light may be provided through the second holes H2 and H2' to the display panel DP.

Figure 22:
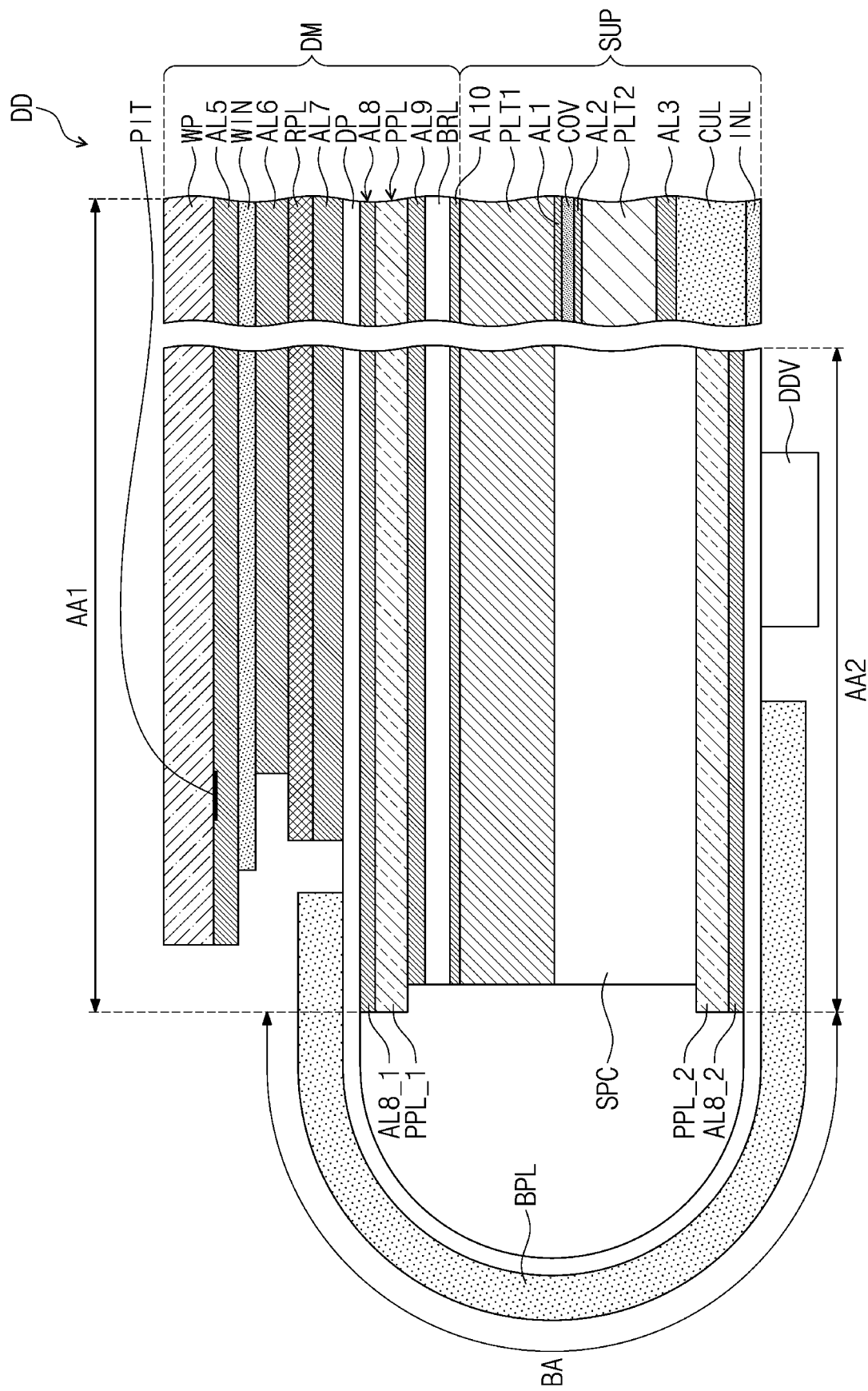
FIG. 22 illustrates a cross-sectional view showing a bended state of the display panel depicted in FIG. 15.

FIG. 22 illustrates a cross-sectional view showing a bended state of the display panel depicted in FIG. 15.

Referring to FIG. 22, the second and third release films RFL2 and RFL3 of FIG. 15 may be removed, and then the bending area BA may bend such that the second area AA2 may be below the first area AA1. Therefore, the data driver DDV may be below the first area AA1.

A spacer SPC may be on a section from which the third release film RFL3 is removed. The spacer SPC may be below the first plate PLT1. The second part PPL_2 of the panel protection layer PPL may be below the spacer SPC.

The spacer SPC may be a double-sided tape. For example, the spacer SPC may include a base layer such as flexible polyethyleneterephthalate and an adhesive on top and bottom surfaces of the base layer. The second part PPL_2 of the panel protection layer PPL may be attached to the spacer SPC. Accordingly, the display device DD may be fabricated as shown in FIG. 22.

The display device DD may include a protection layer BPL. The protection layer BPL may be on the bending area BA, a portion of the first area AA1 adjacent to the bending area BA, and a portion of the second area AA2 adjacent to the bending area BA. The protection layer BPL may extend from the portion of the first area AA1 adjacent to the bending area BA, through the bending area BA, toward the portion of the second area AA2 adjacent to the bending area BA.

The protection layer BPL may serve to protect the bending area BA. The protection layer BPL may cover and protect connection lines on the bending area BA. The protection layer BPL may complement rigidity of the bending area BA, and thus when the bending area BA is bent, cracks in the bending area BA may be prevented or reduced. The protection layer BPL may protect the bending area BA against external impact.

Figure 23:
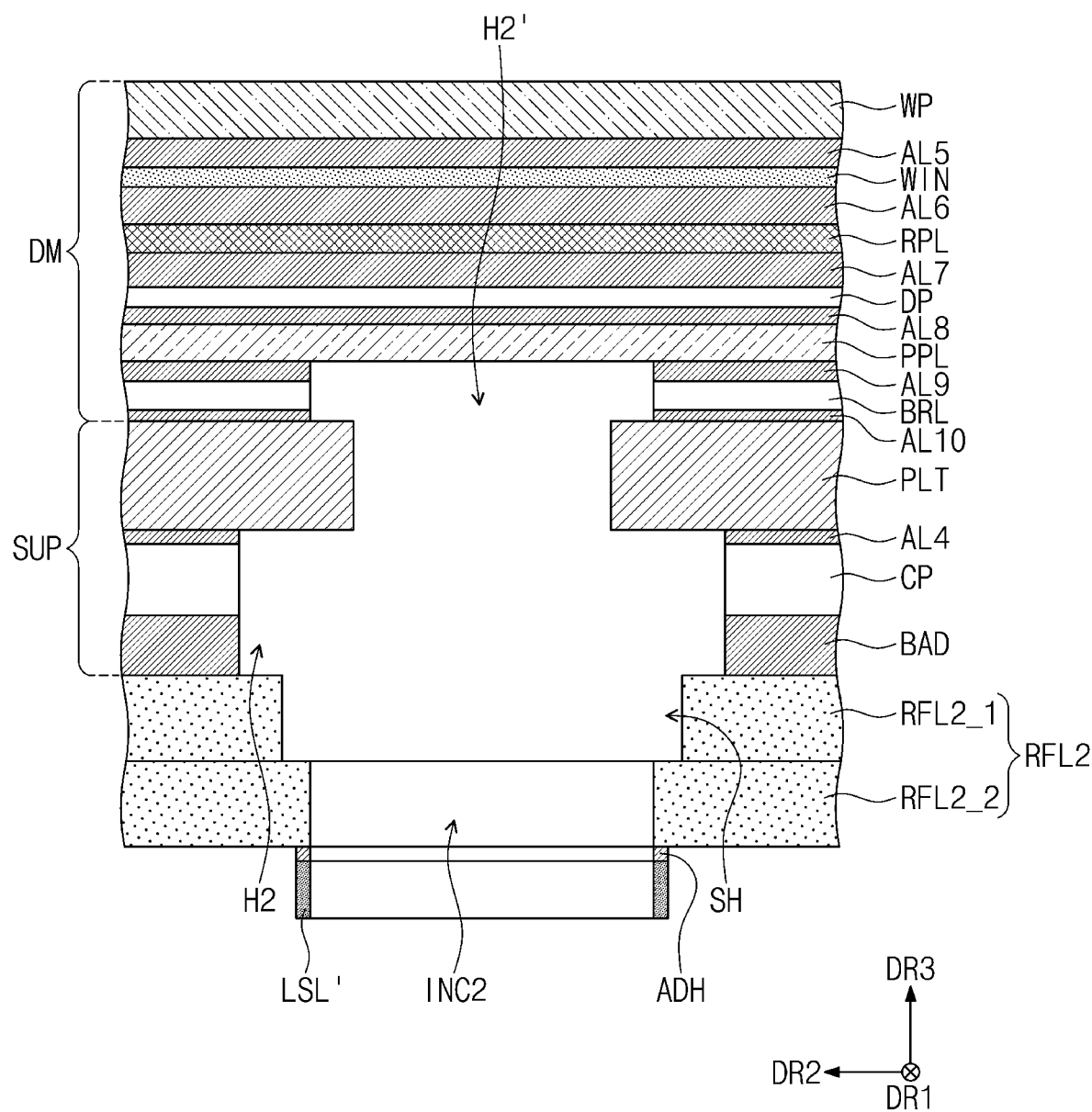
FIGS. 23 and 24 illustrate cross-sectional views showing a light-shield layer according to some embodiments of the present disclosure.
Figure 24:
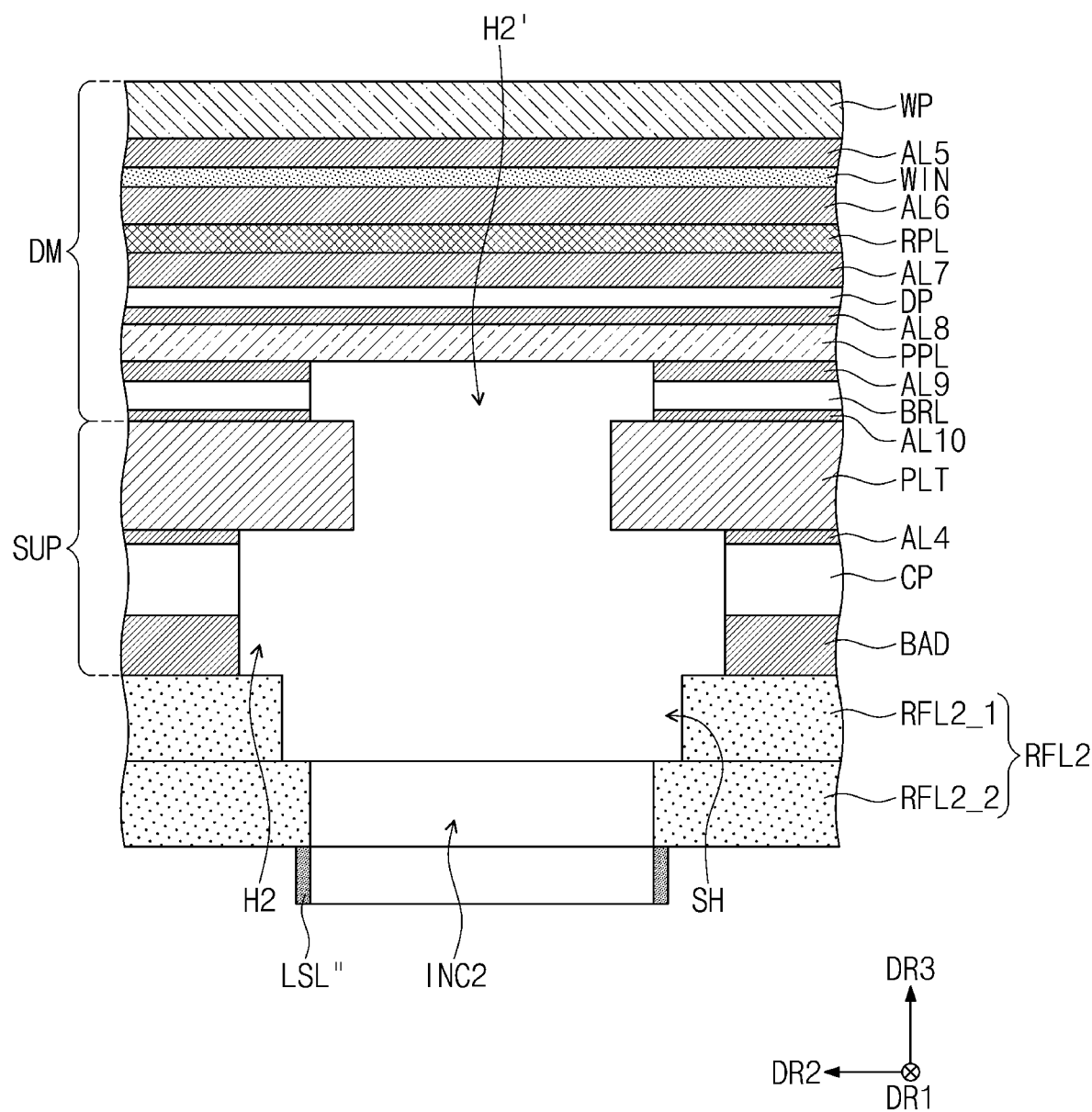

FIGS. 23 and 24 illustrate cross-sectional views showing a light-shield layer according to some embodiments of the present disclosure.

FIGS. 23 and 24 show, by way of example, cross-sections each of which corresponds to that of FIG. 12.

Referring to FIG. 23, a light-shield layer LSL' may be on a bottom surface of the second sub-release film RFL2_2. The light-shield layer LSL' may be attached through an adhesive ADH to the bottom surface of the second sub-release film RFL2_2. The second cut region INC2 may be defined in the light-shield layer LSL', the adhesive ADH, and the second sub-release film RFL2_2.

Referring to FIG. 24, a light-shield layer LSL" may be on a bottom surface of the second sub-release film RFL2_2. For example, an inkjet printing process may be performed in which a black ink may be printed on the bottom surface of the second sub-release film RFL2_2.

Figure 25:
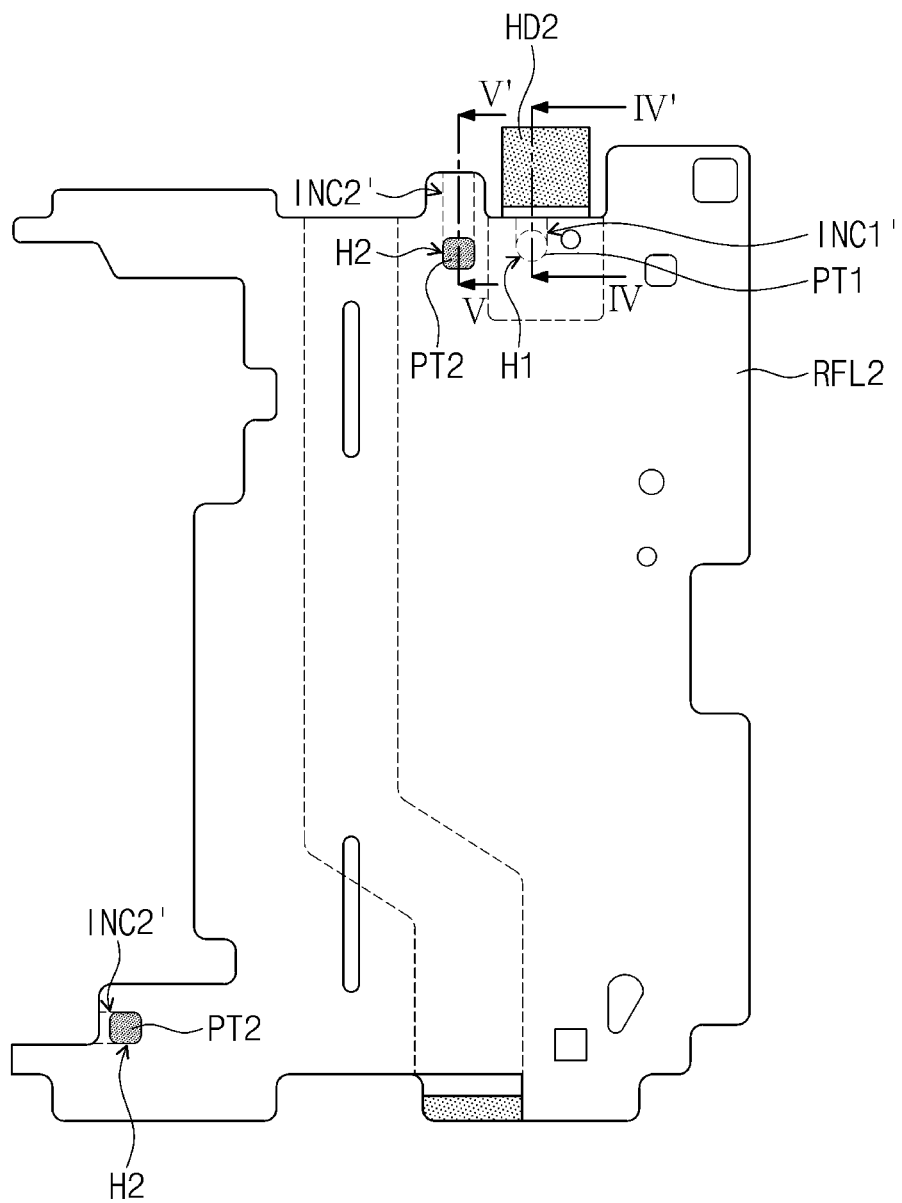
FIG. 25 illustrates a plan view showing a configuration of a cut region according to some embodiments of the present disclosure.
Figure 26:
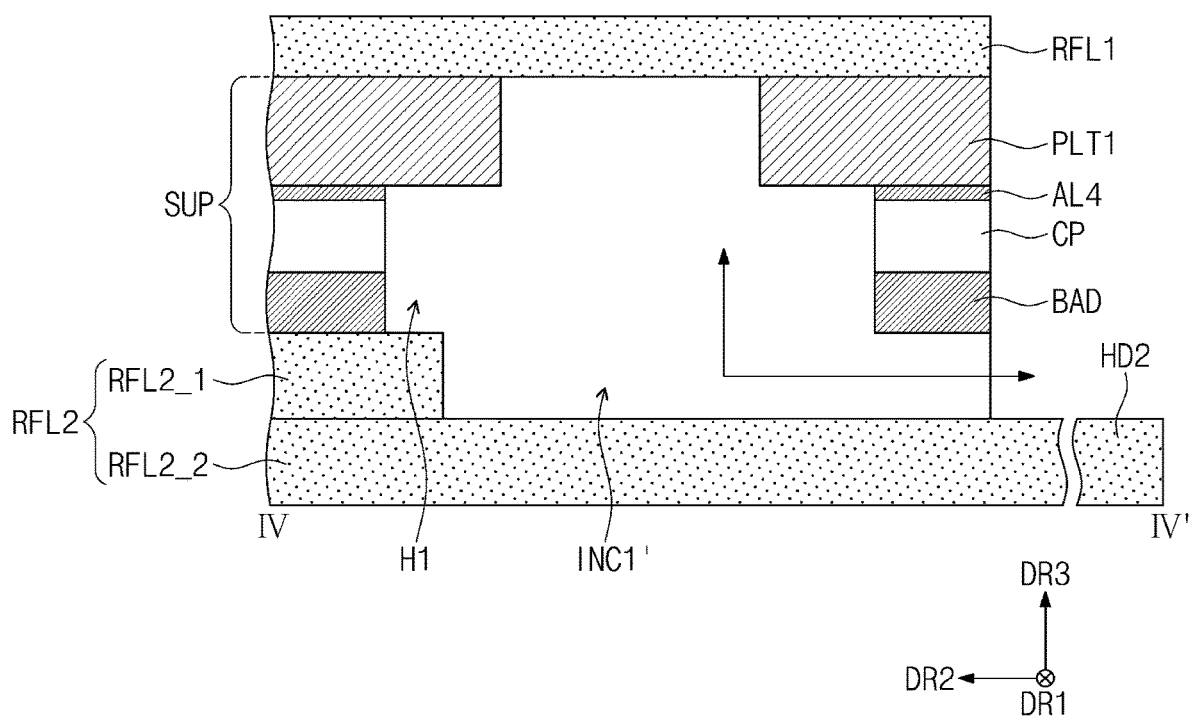
FIG. 26 illustrates a cross-sectional view taken along the line IV-IV' depicted in FIG. 25.
Figure 27:
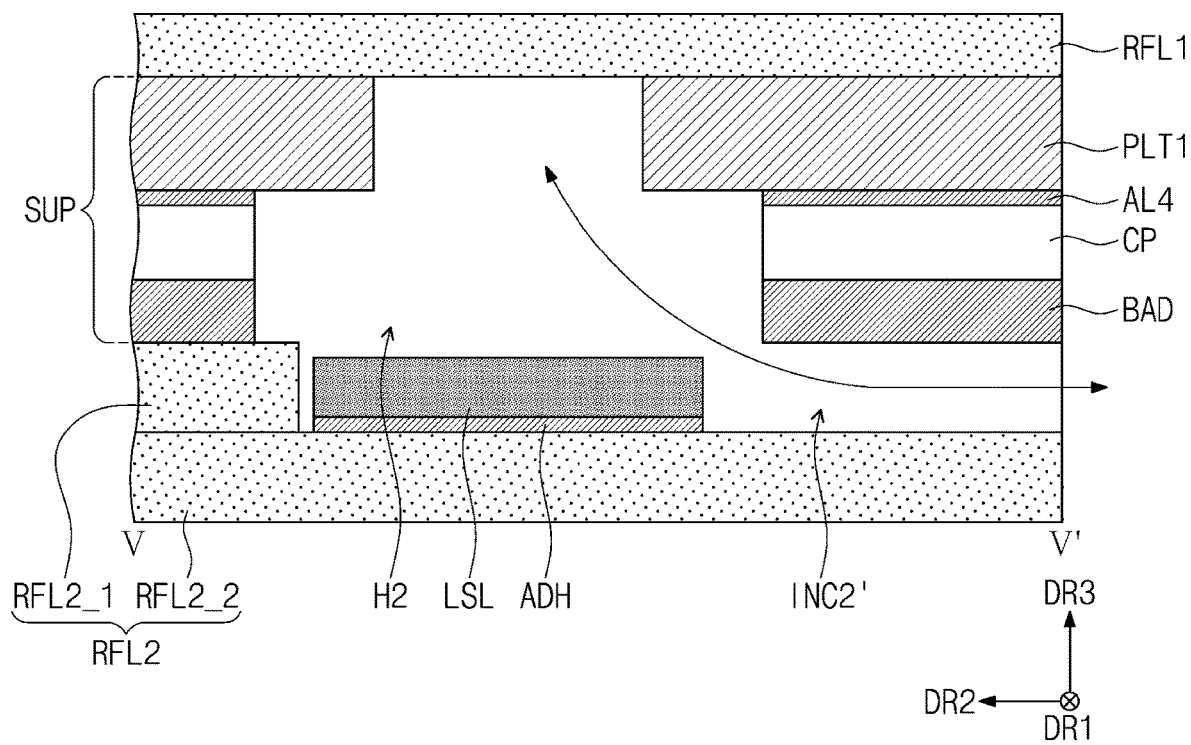
FIG. 27 illustrates a cross-sectional view taken along the line V-V' depicted in FIG. 25.

FIG. 25 illustrates a plan view showing a configuration of a cut region according to some embodiments of the present disclosure, FIG. 26 illustrates a cross-sectional view taken along the line IV-IV' depicted in FIG. 25, and FIG. 27 illustrates a cross-sectional view taken along the line V-V' depicted in FIG. 25.

FIG. 25 shows by way of example only the second release film RFL2.

Referring to FIGS. 25 and 26, a first cut region INC1' may have a certain width, and may be defined to be opened from the first part PT1, which overlaps the first hole H1, of the first sub-release film RFL2_1 to an edge, which is adjacent to the first part PT1, of the first sub-release film RFL2_1.

Unlike the first cut region INC1 of FIG. 9, the first cut region INC1' might not be defined in the second sub-release film RFL2_2. In addition, the first cut region INC1' may be defined to extend in one direction without having a cross shape. The first cut region INC1' may define an air pathway (designated by a two-way arrow in FIG. 26).

Referring to FIGS. 25 and 27, a second cut region INC2' may have a certain width, and may be defined to be opened from the second part PT2, which overlaps the second hole H2, of the first sub-release film RFL2_1 to an edge, which is adjacent to the second part PT2, of the first sub-release film RFL2_1.

Unlike the second cut region INC2 of FIG. 9, the second cut region INC2' might not be defined in the second sub-release film RFL2_2. In addition, the second cut region INC2' may be defined to extend in one direction without having a cross shape. The second cut region INC2' may define an air pathway (designated by a two-way arrow in FIG. 27).

According to some embodiments of the present disclosure, cut regions may be defined in portions of a release film that overlap holes defined by a supporter. When a display module is attached to the supporter, an air pathway may be formed by holes of the display module, the holes of the supporter, and the cut regions. In conclusion, it may be possible to reduce or prevent deformation of an upper portion of the display module that overlaps the holes of the display module.

Although the present disclosure is described in conjunction with some embodiments thereof, it would be understood by those skilled in the art that the present disclosure can be modified or changed in various ways without departing from spirit and scope of the present disclosure defined by the appended claims. Further, the embodiments disclosed herein are not intended to limit the technical spirit of the present disclosure and all technical spirit within the claims and their equivalents should be construed as being included in the present disclosure.

What is claimed is:

1. A release film, comprising:
 a first release film on a supporter, the supporter defining a first hole; and
 a second release film below the supporter,
 wherein, when viewed in a plan view, a first cut region having a cross shape is defined by a first part of the second release film, the first part overlapping the first hole.

2. The release film of claim 1, wherein the first cut region comprises:
 a first sub-cut region that extends in a first direction; and
 a second sub-cut region that extends in a second direction, the second direction crossing the first direction.

3. The release film of claim 2, wherein the second sub-cut region crosses the first sub-cut region.

4. The release film of claim 1, wherein a second hole is defined by the supporter, and
   wherein a second cut region is defined by a second part of the second release film, the second part overlapping the second hole.

5. The release film of claim 4, wherein the second cut region comprises:
   a third sub-cut region that extends in a first direction; and
   a fourth sub-cut region that extends in a second direction, the second direction crossing the first direction.

6. The release film of claim 5, wherein the fourth sub-cut region crosses the third sub-cut region.

7. The release film of claim 4, further comprising a third release film below the supporter, adjacent to the second release film, and not overlapping the second release film in a plan view.

8. The release film of claim 7, wherein the supporter comprises:
   a first plate;
   a cover layer below the first plate;
   a second plate below the cover layer;
   a cushion layer below the second plate;
   an insulation layer below the cushion layer;
   a step compensation layer below the first plate; and
   a border adhesive layer below the step compensation layer, wherein the second release film is below the insulation layer and the border adhesive layer.

9. The release film of claim 8, wherein the first hole and the second hole are defined by the border adhesive layer, the step compensation layer, and the first plate.

10. The release film of claim 8, wherein the third release film is below the first plate, and is adjacent to a first edge of each of the cover layer, the second plate, the cushion layer, and the insulation layer, and
    wherein the step compensation layer and the border adhesive layer are adjacent to a second edge of each of the cover layer, the second plate, the cushion layer, and the insulation layer.

11. A release film, comprising:
    a first release film on a supporter, the supporter defining a first hole and a second hole; and
    a second release film comprising a first sub-release film below the supporter, and a second sub-release film below the first sub-release film,
    wherein, when viewed in a plan view, a first cut region is defined by a first part of the second release film, the first part overlapping the first hole, and a second cut region is defined by a second part of the second release film, the second part overlapping the second hole.

12. The release film of claim 11, wherein the first cut region is defined by the first and second sub-release films.

13. The release film of claim 11, further comprising a light-shield layer on one surface of the second sub-release film.

14. The release film of claim 13, wherein the second cut region is defined by the light-shield layer and the second sub-release film.

15. The release film of claim 13, wherein the light-shield layer is on a top surface of the second sub-release film.

16. The release film of claim 15, wherein the light-shield layer is in a sub-hole defined by a portion of the first sub-release film overlapping the second hole.

17. The release film of claim 13, wherein the light-shield layer is on a bottom surface of the second sub-release film.

18. The release film of claim 13, wherein the light-shield layer is directly on a bottom surface of the second sub-release film.

19. The release film of claim 11, wherein the first cut region has a width, and is opened from a first part of the first sub-release film to an edge of the first sub-release film, the first part overlapping the first hole, and the edge of the first sub-release film being adjacent to the first part.

20. The release film of claim 11, wherein the second cut region has a width, and is opened from a second part of the first sub-release film to an edge of the first sub-release film, the second part overlapping the second hole, and the edge of the first sub-release film being adjacent to the second part.

21. A release film, comprising:
    a first release film on a supporter, the supporter defining a first hole and a second hole;
    a first sub-release film below the supporter;
    a second sub-release film below the first sub-release film; and
    a light-shield layer in a sub-hole defined by a portion of the first sub-release film that overlaps the second hole when viewed in a plan,
    wherein, when viewed in the plan, a first cut region is defined by portions of the first and second sub-release films that overlap the first hole, and
    wherein, when viewed in the plan, a second cut region is defined by the light-shield layer and a portion of the second sub-release film that overlaps the second hole.

* * * * *